US012585357B2

(12) United States Patent
Been et al.

(10) Patent No.: US 12,585,357 B2
(45) Date of Patent: Mar. 24, 2026

(54) ELECTRONIC DEVICE AND METHOD OF DRIVING THE SAME

(71) Applicant: Samsung Display Co., LTD., Yongin-si (KR)

(72) Inventors: Kyounghun Been, Yongin-si (KR); Hyojin Lee, Yongin-si (KR); Byeongkyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/054,647

(22) Filed: Feb. 14, 2025

(65) Prior Publication Data

US 2025/0355523 A1     Nov. 20, 2025

(30) Foreign Application Priority Data

May 14, 2024     (KR) ........................ 10-2024-0063169

(51) Int. Cl.
*G06F 3/041* (2006.01)

(52) U.S. Cl.
CPC ........ *G06F 3/0418* (2013.01); *G06F 3/04162* (2019.05); *G06F 3/04166* (2019.05)

(58) Field of Classification Search
CPC . G06F 3/0418; G06F 3/04162; G06F 3/04166
See application file for complete search history.

(56) References Cited

U.S. PATENT DOCUMENTS

| | | | |
|---|---|---|---|
| 9,766,730 B2 | 9/2017 | Lee | |
| 9,823,777 B2 | 11/2017 | Takayama et al. | |
| 11,347,335 B2 * | 5/2022 | Lee ........................ | G06F 3/0412 |
| 11,467,692 B2 | 10/2022 | Kim et al. | |
| 2006/0146038 A1 * | 7/2006 | Park ........................ | G06F 3/042 345/173 |
| 2016/0116997 A1 * | 4/2016 | Kim .................... | G06F 3/04162 345/174 |
| 2018/0101250 A1 | 4/2018 | Katsurahira et al. | |

(Continued)

FOREIGN PATENT DOCUMENTS

| | | |
|---|---|---|
| KR | 10-1680987 B1 | 11/2016 |
| KR | 10-2021-0156916 A | 12/2021 |
| KR | 10-2338362 B1 | 12/2021 |

*Primary Examiner* — Dmitriy Bolotin
(74) *Attorney, Agent, or Firm* — Womble Bond Dickinson (US) LLP

(57) ABSTRACT

An electronic device includes: a display layer displaying an image; a driving controller receiving an input image signal and a control signal and outputting a horizontal synchronization signal and image data; a data driving circuit configured to provide a data signal to the display layer in response to the horizontal synchronization signal and the image data; a sensor layer on the display layer; and a sensor driver driving the sensor layer and receiving sensing signals, wherein the sensor driver is configured to: output a horizontal synchronization control signal of a first level during a touch sensing mode of detecting a touch input; and output the horizontal synchronization control signal of a second level different from the first level during a pen sensing mode of detecting a pen input, and the driving controller changes a horizontal period of the horizontal synchronization signal in response to the horizontal synchronization control signal.

20 Claims, 17 Drawing Sheets

(56) References Cited

U.S. PATENT DOCUMENTS

| | | | |
|---|---|---|---|
| 2018/0164909 A1* | 6/2018 | Bae | G06F 3/0442 |
| 2018/0181241 A1* | 6/2018 | Jung | G06F 3/0412 |
| 2019/0227692 A1* | 7/2019 | Kim | G06F 3/0445 |
| 2022/0317854 A1* | 10/2022 | Lee | G06F 3/04184 |
| 2022/0391069 A1* | 12/2022 | Cho | G06F 3/04184 |
| 2025/0130671 A1* | 4/2025 | Byun | G09G 3/20 |

* cited by examiner

200C1

200C2     200C

I-CS

I-SS

N_P

H_CTRL

Sensor controller

Signal generation circuit

200C3

TE1    TE2    TS    TE3    TE4

RE1

200

200A

222

221

RE2

211

212

RE3

RE4

200NA

RE5

RE6

Input detection circuit

ELECTRONIC DEVICE AND METHOD OF DRIVING THE SAME

CROSS-REFERENCE TO RELATED APPLICATIONS

The present application claims priority to and the benefit of Korean Patent Application No. 10-2024-0063169, filed on May 14, 2024, in the Korean Intellectual Property Office, the entire disclosure of which is incorporated herein by reference.

BACKGROUND

Aspects of some embodiments of the present disclosure described herein relate to an electronic device.

An electronic device may not only display images but may also detect an external input. The external input may be an input of a user. The input of the user may include various types of external inputs, such as a part of a body of the user, light, heat, a pen, and pressure. The electronic device may recognize coordinates of the pen by using an electromagnetic resonance (EMR) method or may recognize the coordinates of the pen by using an active electrostatic (AES) method.

The above information disclosed in this Background section is only for enhancement of understanding of the background and therefore the information discussed in this Background section does not necessarily constitute prior art.

SUMMARY

Aspects of some embodiments of the present disclosure described herein relate to an electronic device, and for example, relate to an electronic device capable of detecting an external input and a method of driving the same.

Aspects of some embodiments of the present disclosure described herein relate to an electronic device, and for example, relate to an electronic device capable of detecting an external input and a method of driving the same. Aspects of some embodiments of the present disclosure include an electronic device capable of relatively improving the reliability of detecting a pen input and a method of driving the same.

Aspects of some embodiments of the present disclosure include an electronic device including a display layer that displays an image, a driving controller that receives an input image signal and a control signal, and outputs a horizontal synchronization signal and image data, a data driving circuit that provides a data signal to the display layer in response to the horizontal synchronization signal and the image data, a sensor layer that is on the display layer, and a sensor driver that drives the sensor layer and receives sensing signals from the sensor layer. The sensor driver outputs a horizontal synchronization control signal of a first level during a touch sensing mode of detecting a touch input, and outputs the horizontal synchronization control signal of a second level different from the first level during a pen sensing mode of detecting a pen input, and the driving controller changes a horizontal period of the horizontal synchronization signal in response to the horizontal synchronization control signal.

According to some embodiments, the driving controller may output the horizontal synchronization signal including a first horizontal period when the horizontal synchronization control signal is at the first level, and may output the horizontal synchronization signal including a second horizontal period different from the first horizontal period when the horizontal synchronization control signal is at the second level.

According to some embodiments, the second horizontal period of the horizontal synchronization signal may be set such that a frequency of noise included in the sensing signals does not overlap a frequency of a downlink signal from an input device.

According to some embodiments, the horizontal synchronization signal may include a plurality of pulses, and each of the plurality of pulses may have the second horizontal period during the pen sensing mode.

According to some embodiments, the horizontal synchronization signal may include a plurality of pulses, and a time of the second horizontal period of each of the plurality of pulses may be set differently during the pen sensing mode.

According to some embodiments, the driving controller may output the horizontal synchronization signal including a first back porch period when the horizontal synchronization control signal is at the first level, and may output the horizontal synchronization signal including a second back porch period different from the first back porch period when the horizontal synchronization control signal is at the second level.

According to some embodiments, the driving controller may output the horizontal synchronization signal including a first horizontal blank period when the horizontal synchronization control signal is at the first level, and may output the horizontal synchronization signal including a second horizontal blank period different from the first horizontal blank period when the horizontal synchronization control signal is at the second level.

According to some embodiments, the sensor driver may determine a frequency of noise based on the sensing signals when an approach of an input device is detected in the touch sensing mode, and may output the horizontal synchronization control signal of the second level when the frequency of the noise overlaps a downlink frequency of the input device.

According to some embodiments, the sensor driver may determine an amplitude of noise based on the sensing signals when an approach of an input device is detected in the touch sensing mode, and may output the horizontal synchronization control signal of the second level when the amplitude of the noise is greater than a reference value.

According to some embodiments, the driving controller may output a noise pattern signal of an active level when a pattern of the input image signal is a noise pattern.

According to some embodiments, the sensor driver may output the horizontal synchronization control signal of the second level when an approach of an input device is detected in the touch sensing mode and the noise pattern signal is at the active level.

According to some embodiments of the present disclosure, a method of driving an electronic device includes operating in a touch sensing mode of detecting a touch input, outputting a horizontal synchronization control signal of a first level, outputting a horizontal synchronization signal of a first horizontal period in response to the horizontal synchronization control signal of the first level, determining whether an input device is approaching, outputting the horizontal synchronization control signal of a second level different from the first level when an approach of the input device is detected, and outputting the horizontal synchronization signal of a second horizontal period in response to the horizontal synchronization control signal of the second level.

According to some embodiments, the method of driving the electronic device may further include displaying an image on a display layer in response to the horizontal synchronization signal, and receiving sensing signals from a sensor layer on the display layer.

According to some embodiments, the second horizontal period of the horizontal synchronization signal may be set such that a frequency of noise included in the sensing signals does not overlap a frequency of a downlink signal from the input device.

According to some embodiments, the outputting of the horizontal synchronization control signal of the second level different from the first level when the approach of the input device is detected may include determining a frequency of noise based on the sensing signals, and outputting the horizontal synchronization control signal of the second level when the frequency of the noise overlaps a downlink frequency of the input device.

According to some embodiments, the outputting of the horizontal synchronization control signal of the second level different from the first level when the approach of the input device is detected may include determining an amplitude of noise based on the sensing signals, and outputting the horizontal synchronization control signal of the second level when the amplitude of the noise is greater than a reference value.

According to some embodiments, the horizontal synchronization signal may include a first back porch period when the horizontal synchronization control signal is at the first level, and the horizontal synchronization signal may include a second back porch period different from the first back porch period when the horizontal synchronization control signal is at the second level.

According to some embodiments, the horizontal synchronization signal may include a first horizontal blank period when the horizontal synchronization control signal is at the first level, and the horizontal synchronization signal may include a second horizontal blank period different from the first horizontal blank period when the horizontal synchronization control signal is at the second level.

According to some embodiments, the horizontal synchronization signal may include a plurality of pulses, and a time of the second horizontal period of each of the plurality of pulses of the horizontal synchronization signal may be differently set when the approach of the input device is detected.

According to some embodiments, the method of driving the electronic device may further include determining whether a pattern of an input image signal is a noise pattern, and the outputting of the horizontal synchronization control signal of the second level different from the first level when the approach of the input device is detected may include outputting the horizontal synchronization control signal of the second level when the pattern of the input image signal is the noise pattern.

BRIEF DESCRIPTION OF THE DRAWINGS

The above and other aspects and features of embodiments according to the present disclosure will become apparent by describing in more detail aspects of some embodiments thereof with reference to the accompanying drawings.

FIG. 9 is a timing diagram illustrating a vertical synchronization signal and a horizontal synchronization signal.

FIG. 16A and FIG. 16B are diagrams illustrating a signal level change of a coordinate signal according to an approach of an input device when noise is large.

DETAILED DESCRIPTION

Figure 1:
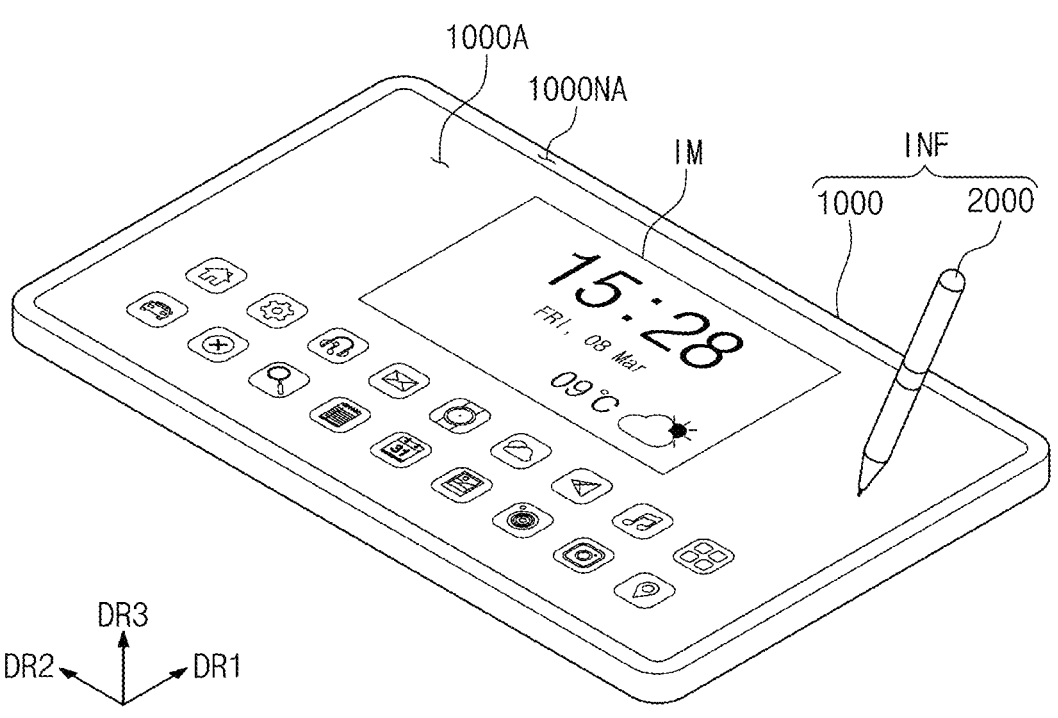
FIG. 1 is a perspective view illustrating an interface device according to some embodiments of the present disclosure.

In the specification, the expression that a first component (or an area, a layer, a part, or a portion) is "on", "connected to", or "coupled to" a second component means that the first component is directly on/connected to/coupled to the second component or means that a third component is interposed therebetween.

The same reference numerals/signs refer to the same components. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component.

For example, without departing from the scope and spirit of the invention, a first component may be referred to as a "second component", and similarly, the second component may be referred to as the "first component". The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, aspects of some embodiments of the present disclosure will be described with reference to the drawings.

FIG. 1 is a perspective view illustrating an interface device INF according to some embodiments of the present disclosure.

Referring to FIG. 1, the interface device INF may include an electronic device 1000 and an input device 2000.

The electronic device 1000 may be a device which is activated depending on an electrical signal and displays images. For example, the electronic device 1000 may be a mobile phone, a tablet, a car navigation system, a game console, a notebook computer, or a wearable device, but is not limited thereto. FIG. 1 illustrates that the electronic device 1000 is a tablet.

In the electronic device 1000, a display area 1000A and a peripheral area 1000NA may be defined. The electronic device 1000 may display the images through the display area 1000A. The display area 1000A may include a surface defined by a first direction DR1 and a second direction DR2. The peripheral area 1000NA may surround the periphery of the display area 1000A. According to some embodiments of the present disclosure, the peripheral area 1000NA may be omitted.

A thickness direction of the electronic device 1000 may be parallel to a third direction DR3 which intersects the first direction DR1 and the second direction DR2. Accordingly, front (or top) and back (or bottom) surfaces of members constituting the electronic device 1000 may be defined based on the third direction DR3.

The electronic device 1000 may display an image IM toward the third direction DR3. The image IM may include a static image as well as a dynamic image. In FIG. 1, a clock and icons are illustrated as examples of the image IM.

The electronic device 1000 may detect an input applied from outside the electronic device 1000. The external input may include various types, such as a part of a body of a user, light, heat, and pressure.

The electronic device 1000 illustrated in FIG. 1 may detect an input by a touch of the user and an input by the input device 2000. The input device 2000 may refer to a device other than the body of the user. The input by the input device 2000 may be referred to as a "first input" or a "pen input", and the input by the body of the user may be referred to as a "second input" or a "touch input". For example, the input device 2000 may be an active pen, a stylus pen, a touch pen, or an electronic pen.

The electronic device 1000 and the input device 2000 may be capable of two-way communication. The electronic device 1000 may provide an uplink signal to the input device 2000. The input device 2000 may provide a downlink signal to the electronic device 1000. The electronic device 1000 may detect the signal provided from the input device 2000 and may generate coordinate information on the first input by using the detected signal.

Figure 2:
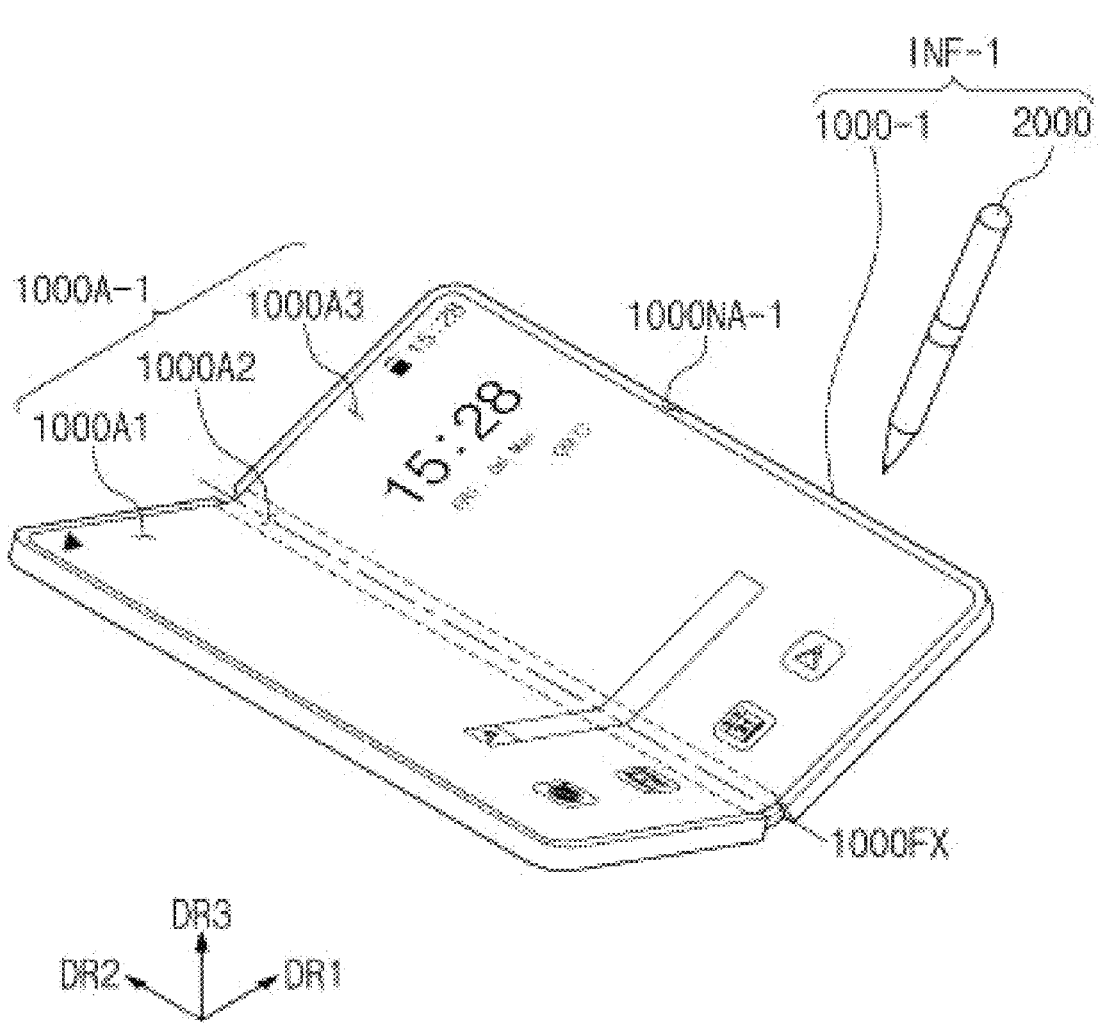
FIG. 2 is a perspective view illustrating an interface device according to some embodiments of the present disclosure.

FIG. 2 is a perspective view illustrating an interface device INF-1 according to some embodiments of the present disclosure. In describing FIG. 2, the same reference numerals are added to the components described with reference to FIG. 1, and some repetitive descriptions thereof may be omitted.

Referring to FIG. 2, the interface device INF-1 may include an electronic device 1000-1 and the input device 2000. FIG. 2 illustrates that the electronic device 1000-1 is a foldable mobile phone.

The electronic device 1000-1 may display the image through a display area 1000A-1. In a state in which the electronic device 1000-1 is unfolded, the display area 1000A-1 may include a plane defined by the first direction DR1 and the second direction DR2.

The display area 1000A-1 may include a first area 1000A1, a second area 1000A2, and a third area 1000A3. The first area 1000A1, the second area 1000A2, and the third area 1000A3 may be sequentially defined in the first direction DR1. The second area 1000A2 may be bent with respect to a folding axis 1000FX extending along the second direction DR2. Accordingly, the first area 1000A1 and the third area 1000A3 may be referred to as "non-folding areas", and the second area 1000A2 may be referred to as a "folding area".

When the electronic device 1000-1 is folded, the first area 1000A1 and the third area 1000A3 may face each other. Therefore, in a completely folded state, the display area 1000A-1 may not be exposed to the outside, which may be referred to as "in-folding". However, this is an example, and an operation of the electronic device 1000-1 is not limited thereto.

For example, according to some embodiments of the present disclosure, when the electronic device 1000-1 is folded, the first area 1000A1 and the third area 1000A3 may face opposite sides from each other. Accordingly, in a folded state, the display area 1000A-1 may be exposed to the outside, which may be referred to as "out-folding".

The electronic device 1000-1 may be implemented to enable only one of an in-folding operation or an out-folding operation. Alternatively, the electronic device 1000-1 may be implemented to enable both in-folding and out-folding operations. In this case, the same area of the electronic device 1000-1, for example, the second area 1000A2, may be in-folding and out-folding.

In FIG. 2, one folding area and two non-folding areas are illustrated as an example, but the number of folding areas and the number of non-folding areas is not limited thereto. For example, the electronic device 1000-1 may include more than two non-folding areas and a plurality of folding areas located between adjacent non-folding areas.

Although FIG. 2 illustrates the folding axis 1000FX extending in the second direction DR2, embodiments according to the present disclosure are not limited thereto. For example, the folding axis 1000FX may extend along a direction parallel to the first direction DR1. In this case, the first area 1000A1, the second area 1000A2, and the third area 1000A3 may be sequentially arranged along the second direction DR2.

The display area 1000A-1 may overlap at least one of electronic modules. For example, the electronic modules may include a camera module, a proximity illuminance sensor, and the like. The electronic modules may receive the external input transmitted through the display area 1000A-1 or provide an output through the display area 1000A-1. A part of the display area 1000A-1 which overlaps the camera module and the proximity illuminance sensor may have a higher transmittance than the other parts of the display area 1000A-1. Accordingly, it may not be necessary to provide an area for placing a plurality of electronic modules in a peripheral area (or non-display area, where images are not displayed) 1000NA-1 around (e.g., in a periphery or outside a footprint of) the display area 1000A-1. As a result, the ratio of the display area 1000A-1 to the entire surface of the electronic device 1000-1 may be relatively increased.

The electronic device 1000-1 and the input device 2000 may be capable of performing two-way communication. The electronic device 1000-1 may provide the uplink signal to the input device 2000. The input device 2000 may provide the downlink signal to the electronic device 1000-1. The electronic device 1000-1 may detect the signal provided from the input device 2000 and may generate the coordinate information on the first input by using the detected signal.

Figure 3:
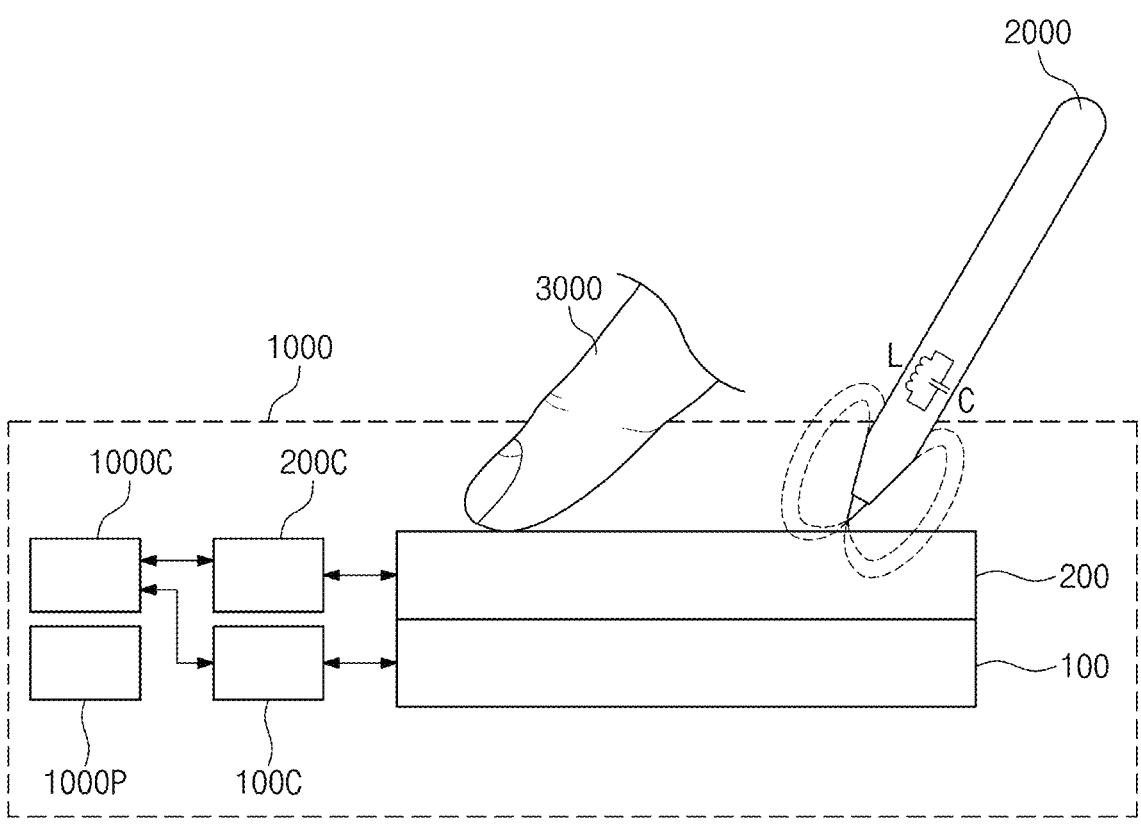
FIG. 3 is a block diagram illustrating an electronic device and an input device, according to some embodiments of the present disclosure.

FIG. 3 is a block diagram illustrating the electronic device 1000 and an input device, according to some embodiments of the present disclosure.

Referring to FIG. 3, the electronic device 1000 may include a display layer 100, a sensor layer 200, a display driver 100C, a sensor driver 2000, and a main controller 1000C.

The display layer 100 may be configured to generate the images. The display layer 100 may be a light emitting display layer. For example, the display layer 100 may include an organic light emitting display layer, an inorganic light emitting display layer, an organic-inorganic light emitting display layer, a quantum dot display layer, a micro light emitting diode (LED) display layer, or may be a nano LED display layer.

The sensor layer 200 may be located on the display layer 100. The sensor layer 200 may detect the first input or the second input applied from the outside. Each of the first input and the second input may be an input means which may provide a change in the capacitance of the sensor layer 200, or an input means which may cause an induced current in the sensor layer 200. For example, the first input may be the input by the input device 2000 (e.g., the pen) or the input by a radio-frequency integrated circuit (RFIC) tag. For example, the input device 2000 may include a passive-type pen or an active-type pen. The second input may be a passive input means such as a body of a user 3000 (e.g., a finger).

According to some embodiments of the present disclosure, the input device 2000 may be a device which generates a magnetic field of a resonant frequency (e.g., a set or predetermined resonant frequency). The input device 2000 may be configured to transmit an output signal based on an electromagnetic resonance method. The input device 2000 may be referred to as an "input pen", a "magnetic pen", the "stylus pen", or an "electromagnetic resonance pen".

The input device 2000 may include a resistor inductor capacitor (RLC) resonance circuit. The RLC resonant circuit may include an inductor "L" and a capacitor "C". According to some embodiments of the present disclosure, the RLC resonance circuit may be a variable resonance circuit which varies a resonance frequency. In this case, the inductor "L" may be a variable inductor, and/or a capacitor "C" may be a variable capacitor, but the inductor "L" and the capacitor "C" may not be particularly limited thereto.

The inductor "L" generates a current by the magnetic field formed in the electronic device 1000, for example, the sensor layer 200. However, it is not particularly limited thereto. For example, when the input device 2000 operates in an active type, the input device 2000 may generate the current even though the input device 2000 does not receive the magnetic field from the outside. The generated current is transferred to the capacitor "C". The capacitor "C" charges the current input from the inductor "L" and discharges the charged current to the inductor "L". Afterwards, the inductor "L" may emit the magnetic field at the resonant frequency. The induced current may flow in the sensor layer 200 due to the magnetic field emitted by the input device 2000, and the induced current may be transmitted to the sensor driver 2000 as a received signal (or sensing signal, signal).

The main controller 1000C may control overall operations of the electronic device 1000. For example, the main controller 1000C may control operations of the display driver 100C and the sensor driver 2000. The main controller 1000C may include at least one microprocessor and may further include a graphics controller. The main controller 1000C may be referred to as an "application processor", "central processing unit", or "main processor".

The display driver 100C may drive the display layer 100. The display driver 100C may receive an input image signal RGB (refer to FIG. 6) and a control signal CTRL (refer to FIG. 6) from the main controller 1000C. The control signal CTRL may include various signals. The display driver 100C may generate control signals (e.g., a scan control signal GCS and a data control signal DCS of FIG. 6) for controlling timing of providing a signal to the display layer 100 based on the control signal CTRL.

The sensor driver 2000 may drive the sensor layer 200. The sensor driver 2000 may receive a control signal I-CS (refer to FIG. 7) from the main controller 1000C. The control signal I-CS may include a clock signal of the sensor driver 2000. Additionally, the control signal I-CS may further include a mode determination signal which determines a driving mode of the sensor driver 2000 and the sensor layer 200.

The sensor driver 2000 may be implemented as an integrated circuit (IC) to be electrically connected to the sensor layer 200. For example, the sensor driver 2000 may be mounted on a separate printed circuit board in a chip-on-film (COF) method to be electrically connected to the sensor layer 200.

The sensor driver 2000 and the sensor layer 200 may selectively operate in a first mode or a second mode. For example, the first mode may be a mode of detecting the input by the input device 2000, for example, the pen input. The second mode may be a mode of detecting the input by the touch of the user, for example, the touch input. The first mode may be referred to as a "pen sensing mode" or a "first sensing mode", and the second mode may be referred to as a "touch sensing mode" or a "second sensing mode".

Switching between the first mode and the second mode may be performed in various ways. For example, the sensor driver 2000 and the sensor layer 200 may be time-dividedly driven into the first mode and the second mode and may detect the first input and the second input. Alternatively, the switching between the first mode and the second mode occurs by a selection of the user or a specific action (or input) of the user. Otherwise, one of the first mode and the second mode may be activated or deactivated by activation or deactivation of a specific application, or the first mode and the second mode may be switched from one to the other. Alternatively, while the sensor driver 2000 and the sensor layer 200 are alternately operating in the first mode and the second mode, the sensor driver 2000 and the sensor layer 200 may be maintained in the first mode when the first input is detected or may be maintained in the second mode when the second input is detected.

The sensor driver 2000 may calculate coordinate information on the input based on the signal received from the sensor layer 200 and provide a coordinate signal I-SS (refer to FIG. 7) having the coordinate information to the main controller 1000C. The main controller 1000C executes an operation corresponding to the user input based on the coordinate signal I-SS. For example, the main controller 1000C may enable the display driver 100C operate to display a new application image on the display layer 100 based on the coordinate signal I-SS.

Figure 6:
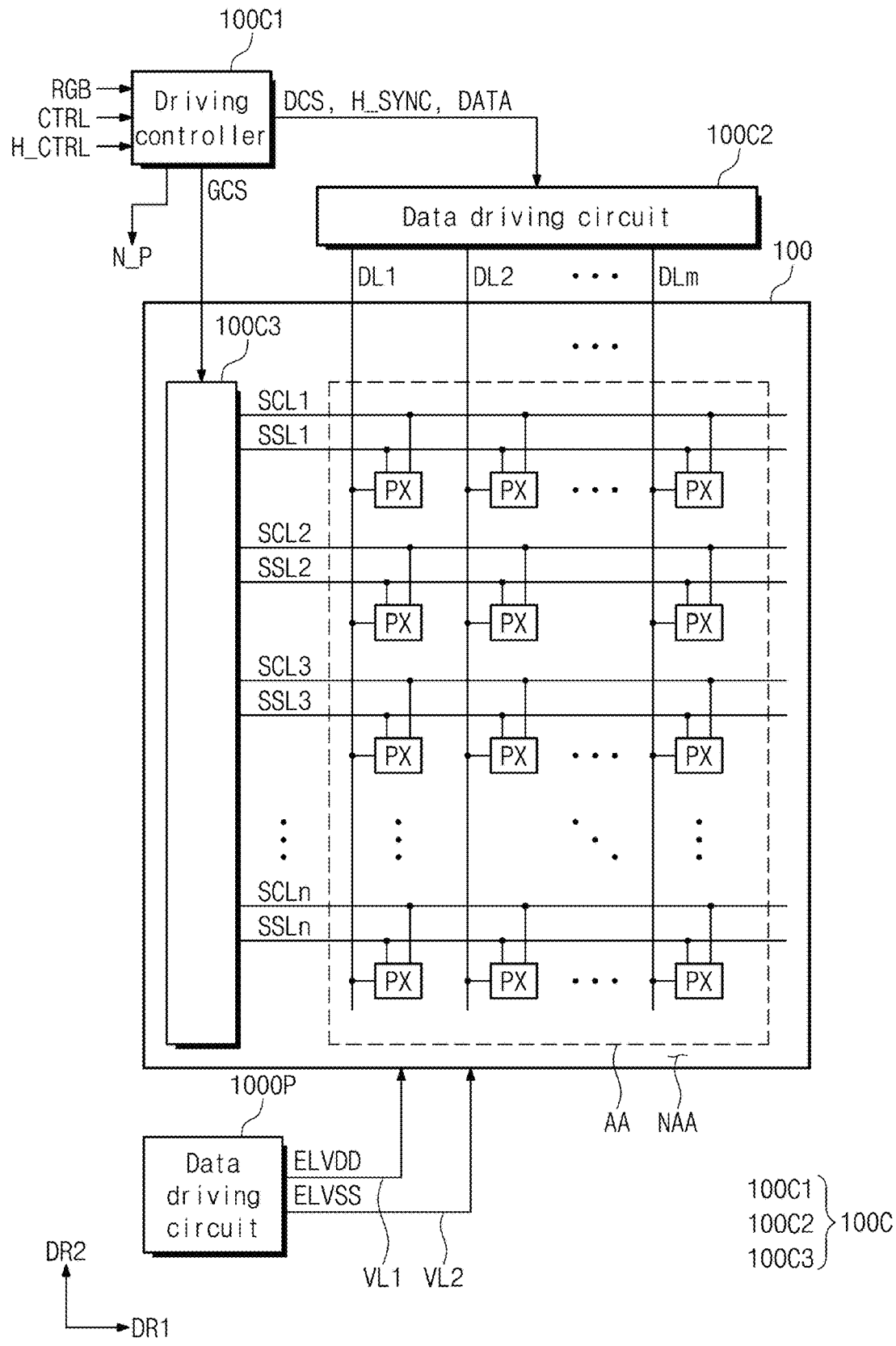
FIG. 6 is a block diagram of a display layer and a display driver, according to some embodiments of the present disclosure.

A power circuit 1000P may include a power management integrated circuit (PMIC). The power circuit 1000P may generate a plurality of driving voltages for driving the display layer 100, the sensor layer 200, the display driver 100C, and the sensor driver 2000. For example, as illustrated in FIG. 6, the plurality of driving voltages may include a gate-on voltage and a gate-off voltage required for an operation of a scan driving circuit 100C3, a first driving voltage ELVDD and a second driving voltage ELVSS required for an operation of the display layer 100, but are not limited thereto.

Figure 4A:
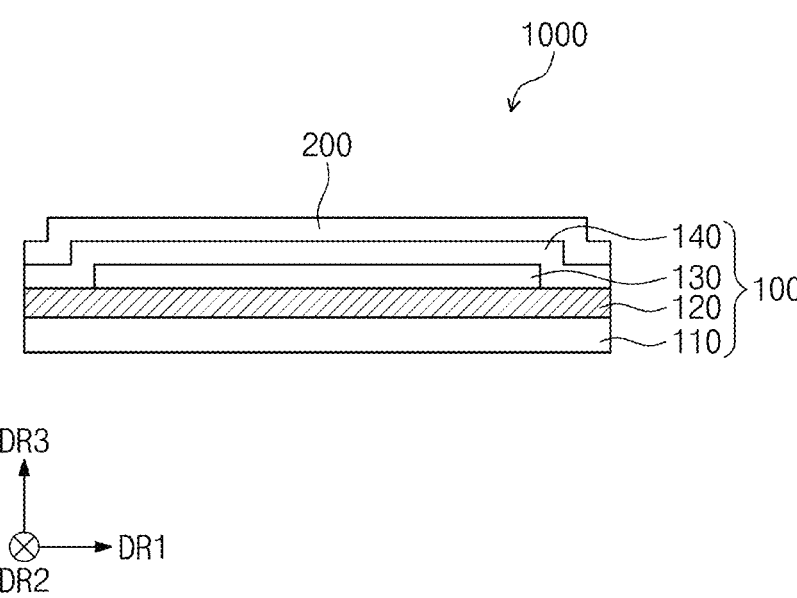
FIG. 4A is a cross-sectional view of an electronic device according to some embodiments of the present disclosure.

FIG. 4A is a cross-sectional view of the electronic device 1000 according to some embodiments of the present disclosure.

Referring to FIG. 4A, the electronic device 1000 may include the display layer 100 and the sensor layer 200. The display layer 100 may include a base layer 110, a circuit layer 120, a light emitting element layer 130, and an encapsulation layer 140.

The base layer 110 may be a member providing a base surface on which the circuit layer 120 is located. The base layer 110 may be a glass substrate, a metal substrate, or a polymer substrate. However, the embodiments according to the present disclosure are not limited thereto, and the base layer 110 may be an inorganic layer, an organic layer, or a composite material layer.

The base layer 110 may have a multi-layer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a "base barrier layer".

The circuit layer 120 may be located on the base layer 110. The circuit layer 120 may include an insulating layer, a semiconductor pattern, a conductive pattern, a signal line, and the like. The insulating layer, a semiconductor layer, and a conductive layer are formed on the base layer 110 by coating, deposition, and the like. Thereafter, the insulating layer, the semiconductor layer, and the conductive layer may be selectively patterned through a plurality of photolithography processes. Thereafter, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro LED, or a nano LED.

The encapsulation layer 140 may be located on the light emitting element layer 130. The encapsulation layer 140 may protect the light emitting element layer 130 from foreign substances such as moisture, oxygen, and dust particles.

The sensor layer 200 may be formed on the display layer 100 through a continuous process. In this case, it may be expressed that the sensor layer 200 is directly located on the display layer 100. The direct location may mean that a third element is not located between the sensor layer 200 and the display layer 100. That is, a separate adhesive member may not be located between the sensor layer 200 and the display layer 100. Alternatively, the sensor layer 200 may be coupled to the display layer 100 through an adhesive member. The adhesive member may include a conventional adhesive or a cohesionant.

Figure 4B:
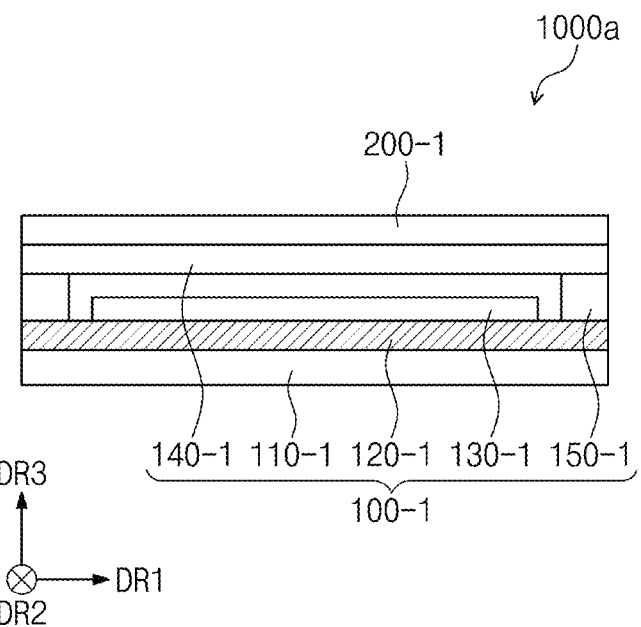
FIG. 4B is a cross-sectional view of an electronic device according to some embodiments of the present disclosure.

FIG. 4B is a cross-sectional view of an electronic device 1000a according to some embodiments of the present disclosure.

Referring to FIG. 4B, the electronic device 1000a may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be the glass substrate, the metal substrate, or the polymer substrate, but is not particularly limited thereto.

The coupling member 150-1 may be located between the base substrate 110-1 and the encapsulation substrate 140-1. The coupling member 150-1 may couple the encapsulation substrate 140-1 to the base substrate 110-1 or the circuit layer 120-1. The coupling member 150-1 may include an inorganic material or an organic material. For example, the inorganic material may include a frit seal, and the organic material may include a photocurable resin or a photoplastic resin. However, a material forming the coupling member 150-1 is not limited to the above examples.

The sensor layer 200-1 may be directly located on the encapsulation substrate 140-1. The direct location may mean that the third component is not located between the sensor layer 200-1 and the encapsulation substrate 140-1. That is, the separate adhesive member may not be located between the sensor layer 200-1 and the display layer 100-1. However, embodiments according to the present disclosure are not limited thereto, and an adhesive layer may be further located between the sensor layer 200-1 and the encapsulation substrate 140-1.

Figure 5:
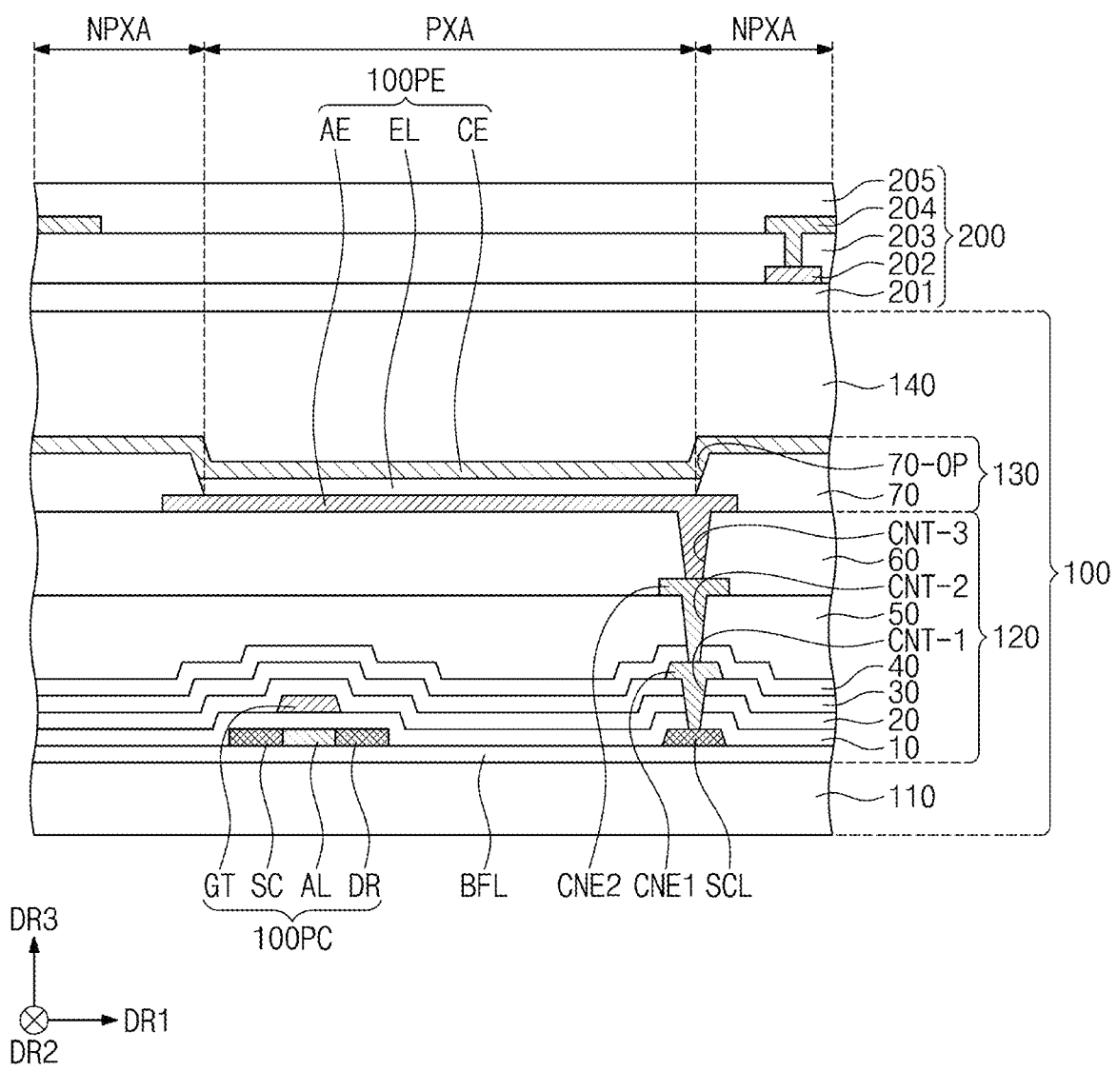
FIG. 5 is a cross-sectional view of an electronic device according to some embodiments of the present disclosure.

FIG. 5 is a cross-sectional view of an electronic device according to some embodiments of the present disclosure. In describing FIG. 5, the same reference numerals are denoted together with respect to the components described through FIG. 4A, and some repetitive description thereof may be omitted.

Referring to FIG. 5, at least one inorganic layer may be formed on a top surface of the base layer 110. The inorganic layer may include at least one among aluminum oxide, titanium oxide, silicon oxide, silicon oxynitride, zirconium oxide, and hafnium oxide. The inorganic layer may be formed in multiple layers. Multi-layer inorganic layers may constitute a barrier layer and/or a buffer layer. In the present embodiments, it is illustrated that the display layer 100 includes a buffer layer BFL.

The buffer layer BFL may relatively improve a bonding force between the base layer 110 and the semiconductor pattern. The buffer layer BFL may include the silicon oxide layer and a silicon nitride layer, and the silicon oxide layer and the silicon nitride layer may be alternately stacked.

Semiconductor patterns SC, AL, DR, and SCL may be located on the buffer layer BFL. The semiconductor patterns SC, AL, DR, and SCL may include polysilicon. However, embodiments according to the present disclosure are not limited thereto, and the semiconductor patterns SC, AL, DR, and SCL may include amorphous silicon, low-temperature polycrystalline silicon, or an oxide semiconductor.

FIG. 5 merely illustrates some of the semiconductor patterns SC, AL, DR, and SCL, and the semiconductor pattern may be further located in another area. The semiconductor patterns SC, AL, DR, and SCL may be arranged across pixels in a specific rule. The semiconductor patterns SC, AL, DR, and SCL may have different electrical properties according to whether they are doped or not. The semiconductor patterns SC, AL, DR, and SCL may include first areas SC, DR, and SCL having high conductivity and second area AL having low conductivity. The first areas SC, DR, and SCL may be doped with an N-type dopant or a P-type dopant. A P-type transistor may include a doped area doped with the P-type dopant, and a N-type transistor may include a doped area doped with the N-type dopant. The second area AL may be an undoped area, or may be doped at a lower concentration compared to the first areas SC, DR, and SCL.

The conductivity of the first areas SC, DR, and SCL may be greater than that of the second area AL, and the first areas SC, DR, and SCL may serve as an electrode or the signal line. The second area AL may correspond to an active area (or channel) of a transistor. In other words, a part (e.g., the second area AL) of the semiconductor patterns SC, AL, DR, and SCL may be an active area AL of a transistor 100PC, and another part (e.g., the first areas SC and DR) may be a source area SC or a drain area DR of the transistor 100PC, and the other part (e.g., a first area SCL) may be a connection electrode or a connection signal line SCL.

Each of the pixels may include an equivalent circuit including a plurality of transistors, at least one capacitor, and at least one light emitting element, and the equivalent circuit of the pixel may be modified in various forms. In FIG. 5, the transistor 100PC and a light emitting element 100PE included in the pixel are illustrated.

The source area SC, the active area AL, and the drain area DR of the transistor 100PC may be formed from the semiconductor patterns SC, AL, DR, and SCL. The source area SC and the drain area DR may extend from the active area AL in opposite directions on a cross section. FIG. 5 illustrates a part of the connection signal line SCL formed from the semiconductor patterns SC, AL, DR, and SCL. According to some embodiments, the connection signal line SCL may be connected to the drain area DR of the transistor 100PC on a plane.

A first insulating layer 10 may be located on the buffer layer BFL. The first insulating layer 10 commonly overlaps a plurality of pixels and may cover the semiconductor patterns SC, AL, DR, and SCL. The first insulating layer 10 may be the inorganic layer and/or the organic layer and may have a single-layer structure or a multi-layer structure. The first insulating layer 10 may include at least one among aluminum oxide, titanium oxide, silicon nitride, silicon oxynitride, zirconium oxide, and hafnium oxide. According to some embodiments, the first insulating layer 10 may be a single-layered silicon oxide layer. The insulating layer of not only the first insulating layer 10 but also the circuit layer 120 to be described in more detail later may be the inorganic layer and/or the organic layer, and may have the single-layer structure or the multi-layer structure. The inorganic layer may include at least one of the above-described materials, but embodiments according to the present disclosure are not limited thereto.

A gate GT of the transistor 100PC is located on the first insulating layer 10. The gate GT may be a part of the metal pattern. The gate GT overlaps the active area AL. In the process of doping or reducing the semiconductor patterns SC, AL, DR, and SCL, the gate GT may function as a mask.

A second insulating layer 20 is located on the first insulating layer 10 and may cover the gate GT. The second insulating layer 20 may overlap the pixels in common. The second insulating layer 20 may be the inorganic layer and/or the organic layer, and may have the single-layer structure or the multi-layer structure. The second insulating layer 20 may include at least one among silicon oxide, silicon nitride, and silicon oxy nitride. According to some embodiments, the second insulating layer 20 may have the multi-layer structure including the silicon oxide layer and the silicon nitride layer.

A third insulating layer 30 may be located on the second insulating layer 20. The third insulating layer 30 may have the single-layer structure or the multi-layer structure. For example, the third insulating layer 30 may have the multi-layer structure including the silicon oxide layer and the silicon nitride layer.

A first connection electrode CNE1 may be located on the third insulating layer 30. The first connection electrode CNE1 may be connected to the connection signal line SCL through a contact hole CNT-1 penetrating the first to third insulating layers 10 to 30.

A fourth insulating layer 40 may be located on the third insulating layer 30. The fourth insulating layer 40 may be the single-layered silicon oxide layer. A fifth insulating layer 50 may be located on the fourth insulating layer 40. The fifth insulating layer 50 may be the organic layer.

A second connection electrode CNE2 may be located on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 is located on the fifth insulating layer 50 and may cover the second connection electrode CNE2. The sixth insulating layer 60 may be the organic layer.

The light emitting element layer 130 may be located on the circuit layer 120. The light emitting element layer 130 may include the light emitting element 100PE. For example, the light emitting element layer 130 may include the organic light emitting material, the inorganic light emitting material, the organic-inorganic light emitting material, the quantum dot, the quantum rod, the micro LED, or the nano LED. Hereinafter, a case in which the light emitting element 100PE is an organic light emitting element will be described as an example, but embodiments according to the present disclosure are not limited thereto.

The light emitting element 100PE may include a first electrode AE, alight emitting layer EL, and a second electrode CE. The first electrode AE may be located on the sixth insulating layer 60. The first electrode AE may be connected to the second connection electrode CNE2 through a contact hole CNT-3 penetrating the sixth insulating layer 60.

A pixel defining film 70 is located on the sixth insulating layer 60 and may cover a part of the first electrode AE. An opening 70-OP is defined in the pixel defining film 70. The opening 70-OP of the pixel defining film 70 exposes at least a part of the first electrode AE.

The display area 1000A (refer to FIG. 1) may include a light emitting area PXA and a non-light emitting area NPXA adjacent to the light emitting area PXA. The non-light emitting area NPXA may surround the light emitting area PXA. According to some embodiments, the light emitting area PXA is defined to correspond to a partial area of the first electrode AE exposed by the opening 70-OP.

The light emitting layer EL may be located on the first electrode AE. The light emitting layer EL may be located in an area corresponding to the opening 70-OP. Although FIG. 5 illustrates an example in which the light emitting layer EL is located in the opening 70-OP, the light emitting layer EL is not particularly limited thereto. For example, the light emitting layer EL may extend to cover a side surface of the pixel defining film 70 defining the opening 70-OP and a part of an upper surface of the pixel defining film 70.

According to some embodiments of the present disclosure, the light emitting layer EL may be formed separately for each of the pixels. When the light emitting layer EL is formed separately for each of the pixels, each of the light emitting layers EL may emit light of at least one color among blue, red, and green. However, embodiments according to the present disclosure are not limited thereto, and the light emitting layer EL may be connected to the pixels and included commonly in the pixels. In this case, the light emitting layer EL may provide blue light or white light.

The second electrode CE may be located on the light emitting layer EL. The second electrode CE may have an integrated shape and may be commonly included in the plurality of pixels.

According to some embodiments of the present disclosure, a hole control layer may be located between the first electrode AE and the light emitting layer EL. The hole control layer may be arranged commonly in the light emitting area PXA and the non-light emitting area NPXA. The hole control layer may include a hole transport layer, and may further include a hole injection layer. An electron control layer may be located between the light emitting layer EL and the second electrode CE. The electron control layer may include an electron transport layer, and may further include an electron injection layer. The hole control layer and the electron control layer may be commonly formed in the plurality of pixels by using an open mask or an inkjet process.

The encapsulation layer 140 may be located on the light emitting element layer 130. The encapsulation layer 140 may include the inorganic layer, the organic layer, and the inorganic layer sequentially stacked, but the layers constituting the encapsulation layer 140 are not limited thereto. The inorganic layers may protect the light emitting element layer 130 from moisture and oxygen, and the organic layer may protect the light emitting element layer 130 from foreign substances such as dust particles. The inorganic layers may include the silicon nitride layer, the silicon oxy nitride layer, the silicon oxide layer, a titanium oxide layer, or an aluminum oxide layer. The organic layer may include an acrylic-based organic layer, but is not limited thereto.

The sensor layer 200 may include a base insulating layer 201, a first conductive layer 202, an intermediate insulating layer 203, a second conductive layer 204, and a cover insulating layer 205.

The base insulating layer 201 may be the inorganic layer including at least one among silicon nitride, silicon oxynitride, and silicon oxide. Alternatively, the base insulating layer 201 may be the organic layer including an epoxy resin, an acrylic resin, or an imide-based resin. The base insulating layer 201 may have the single-layer structure, or may have the multi-layer structure stacked along the third direction DR3.

Each of the first conductive layer 202 and the second conductive layer 204 may have the single-layer structure or the multi-layer structure stacked along the third direction DR3.

Each of the first conductive layer 202 and the second conductive layer 204 of the single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include a conductive polymer such as poly 3,4-ethylenedioxythiophene (PEDOT), a metal nanowire, or graphene.

Each of the first conductive layer 202 and the second conductive layer 204 having the multi-layer structure may include metal layers. The metal layers may have, for example, a three-layer structure of titanium/aluminum/titanium. The conductive layer having the multi-layer structure may include at least one metal layer and at least one transparent conductive layer.

According to some embodiments of the present disclosure, the thickness of the first conductive layer 202 may be greater than or equal to the thickness of the second conductive layer 204. When the thickness of the first conductive layer 202 is greater than the thickness of the second conductive layer 204, the resistance of components (e.g., the electrode, a sensing pattern, or a bridge pattern) included in the first conductive layer 202 may be reduced. Additionally, because the first conductive layer 202 is located below the second conductive layer 204, even though the thickness of the first conductive layer 202 is increased, the probability that the components included in the first conductive layer 202 are visually recognized by external light reflection may be lower than that of the second conductive layer 204.

At least one among the intermediate insulating layer 203 and the cover insulating layer 205 may include the inorganic layer. The inorganic layer may include at least one among aluminum oxide, titanium oxide, silicon oxide, silicon nitride, silicon oxy nitride, zirconium oxide, and hafnium oxide.

At least one among the intermediate insulating layer 203 and the cover insulating layer 205 may include an organic film. The organic film may include at least one among the acrylic-based resin, a methacrylic-based resin, a polyisoprene-based resin, a vinyl-based resin, the epoxy-based resin, a urethane-based resin, a cellulose-based resin, a siloxane-based resin, a polyimide-based resin, a polyamide-based resin, and a perylene-based resin.

Previously, it is described as an example that the sensor layer 200 includes the first conductive layer 202 and the second conductive layer 204, that is, a total of two conductive layers, but it is not particularly limited thereto. For example, the sensor layer 200 may include three or more conductive layers.

FIG. 6 is a block diagram of the display layer 100 and the display driver 100C, according to some embodiments of the present disclosure.

Referring to FIG. 6, the display driver 100C includes a driving controller 100C1, a data driving circuit 100C2, and the scan driving circuit 100C3.

The display layer 100 includes driving scan lines SCL1 to SCLn, sensing scan lines SSL1 to SSLn, data lines DL1 to DLm, and pixels PX. "N" and "M" are integers greater than or equal to 1. The display layer 100 may be divided into an active area AA and a non-active area NAA. The pixels PX may be located in the active area AA of the display layer 100, and the scan driving circuit 100C3 may be located in the non-active area NAA of the display layer 100.

The driving scan lines SCL1 to SCLn and the sensing scan lines SSL1 to SSLn extend in parallel to the first direction DR1, and are arranged to be spaced apart from each other in the second direction DR2. The second direction DR2 may be a direction intersecting the first direction DR1. The data lines DL1 to DLm extend in parallel to the second direction DR2, and are arranged to be spaced apart from each other in the first direction DR1.

A plurality of pixels PX are electrically connected to the driving scan lines SCL1 to SCLn, the sensing scan lines SSL1 to SSLn, and the data lines DL1 to DLm, respectively. Each of the plurality of pixels PX may be electrically connected to two scan lines. However, the number of scan lines connected to each of the plurality of pixels PX is not limited thereto. For example, each of the plurality of pixels PX may be electrically connected to one or three scan lines. The display layer 100 may extend in the second direction DR2 and may further include read-out lines (or referred to as "sensing lines") arranged in the first direction DR1. In this case, the plurality of pixels PX may be connected to the read-out lines.

Each of the plurality of pixels PX includes the light emitting element and a pixel circuit unit which controls light emission of the light emitting element. The light emitting element may include an organic light emitting diode, an inorganic light emitting diode, the micro LED, or the nano LED. The pixel circuit unit may include a plurality of transistors and at least one capacitor.

The driving controller 100C1 receives the input image signal RGB and the control signal CTRL from the main controller 1000C (refer to FIG. 3). The driving controller 100C1 may convert the input image signal RGB to generate image data DATA.

The driving controller 100C1 generates the scan control signal GCS, the data control signal DCS, and a horizontal synchronization signal H_SYNC based on the control signal CTRL. The data driving circuit 100C2 receives the data control signal DCS, the horizontal synchronization signal H_SYNC, and the image data DATA from the driving controller 100C1. The data driving circuit 100C2 converts the image data DATA into data voltages (or referred to as "data signals") in response to the data control signal DCS and the horizontal synchronization signal H_SYNC. The data driving circuit 100C2 outputs the data voltages to the plurality of data lines DL1 to DLm. The data voltages may be analog voltages corresponding to a grayscale value of the image data DATA.

According to some embodiments, the driving controller 100C1 determines a pattern of the input image signal RGB. When the driving controller 100C1 determines that the pattern of the input image signal RGB is the noise pattern affecting the sensor layer 200, a noise pattern signal N_P of an active level is output.

According to some embodiments, the driving controller 100C1 controls the horizontal synchronization signal H_SYNC in response to a horizontal synchronization control signal H_CTRL. The horizontal synchronization control signal H_CTRL may be provided from the sensor driver 2000. An operation in which the driving controller 100C1 controls the horizontal synchronization signal H_SYNC in response to the horizontal synchronization control signal H_CTRL will be described in detail later.

Alternatively, the data driving circuit 100C2 may be further connected to a plurality of read-out lines. In this case, the data driving circuit 100C2 may further receive a sensing control signal from the driving controller 100C1, and may detect characteristics of elements included in each of the plurality of pixels PX of the display layer 100 in response to the sensing control signal.

According to some embodiments of the present disclosure, the data driving circuit 100C2 may be formed in the form of at least one chip (or an integrated circuit). The data driving circuit 100C2 may be located in the non-active area NAA of the display layer 100, but is not limited thereto. For example, the data driving circuit 100C2 may be mounted on a circuit film connected to the display layer 100.

The scan driving circuit 100C3 receives the scan control signal GCS from the driving controller 100C1. The scan driving circuit 100C3 may output the scan signals in response to the scan control signal GCS. The scan driving circuit 100C3 may be embedded in the display layer 100. When the scan driving circuit 100C3 is embedded in the display layer 100, the scan driving circuit 100C3 may include transistors formed through the same process as that of the pixel circuit unit of each of the pixels PX. The scan driving circuit 100C3 may be located in the non-active area NAA of the display layer 100, but embodiments according to the present disclosure are not limited thereto. According to some embodiments, at least a part of the scan driving circuit 100C3 may overlap the active area AA of the display layer 100.

The scan driving circuit 100C3 may generate a plurality of driving scan signals and a plurality of sensing scan signals in response to the scan control signal GCS. The plurality of driving scan signals are applied to the driving scan lines SCL1 to SCLn, and the plurality of sensing scan signals are applied to the sensing scan lines SSL1 to SSLn.

Each of the plurality of pixels PX may receive the first driving voltage ELVDD and the second driving voltage ELVSS.

The power circuit 1000P generates voltages required for operations of the display layer 100. According to some embodiments of the present disclosure, the power circuit 1000P generates the first driving voltage ELVDD and the second driving voltage ELVSS required for the operations of the display layer 100. The first driving voltage ELVDD and the second driving voltage ELVSS may be provided to the display layer 100 through a first driving voltage line VL1 and a second driving voltage line VL2.

The power circuit 1000P may further generate various voltages (e.g., a gamma reference voltage, a data driving voltage, the gate-on voltage, and the gate-off voltage) required for the operation of the data driving circuit 100C2 and the scan driving circuit 100C3 as well as the first driving voltage ELVDD and the second driving voltage ELVSS.

Figure 7:
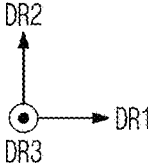
FIG. 7 is a block diagram of a sensor layer and a sensor driver, according to some embodiments of the present disclosure.

FIG. 7 is a block diagram of the sensor layer 200 and the sensor driver 2000, according to some embodiments of the present disclosure.

Referring to FIG. 7, an effective sensing area 200A and an invalid sensing area 200NA may be defined in the sensor layer 200. The effective sensing area 200A may be an area which is activated by the electrical signal. For example, the effective sensing area 200A may be an area for sensing the input. The effective sensing area 200A may overlap the active area AA (refer to FIG. 6) of the display layer 100 (refer to FIG. 6). The invalid sensing area 200NA may surround the effective sensing area 200A. The invalid sensing area 200NA may be an area which does not detect the input. The invalid sensing area 200NA may overlap the non-active area NAA (refer to FIG. 6) of the display layer 100 (refer to FIG. 6).

The sensor layer 200 may include a plurality of first electrodes TE1 to TE4 (or referred to as "transmission electrodes") and a plurality of second electrodes RE1 to RE6 (or referred to as "reception electrodes"). Each of the plurality of first electrodes TE1 to TE4 may extend in the second direction DR2, and the plurality of first electrodes TE1 to TE4 may be arranged to be spaced apart from each other in the first direction DR1. Each of the plurality of second electrodes RE1 to RE6 may extend in the first direction DR1, and the plurality of second electrodes RE1 to RE6 may be arranged to be spaced apart from each other in the second direction DR2.

The sensor layer 200 may further include a plurality of first signal wires (or first trace wires) connected to the plurality of first electrodes TE1 to TE4 and a plurality of second signal wires (or second trace wires) connected to the plurality of reception electrodes RE1 to RE6.

Each of the plurality of first electrodes TE1 to TE4 may include a first sensing part 211 and a bridge part 212. The two adjacent first sensing parts 211 may be electrically connected to each other by the bridge part 212, but are not particularly limited thereto. The first sensing part 211 and the bridge part 212 may be located on different layers from each other.

Each of the plurality of second electrodes RE1 to RE6 may include a second sensing part 221 and a connection part 222. The second sensing part 221 and the connection part 222 may have the integrated shape and may be arranged on the same layer. Each of the plurality of first electrodes TE1 to TE4 may have a mesh shape, and each of the plurality of second electrodes RE1 to RE6 may have the mesh shape.

The first and second sensing parts 211 and 221, the bridge part 212, and the connection part 222 may include the metal layer. Each of the first and second sensing parts 211 and 221, the bridge part 212, and the connection part 222 may have the mesh shape.

The sensor driver 2000 may receive the control signal I-CS from the main controller 1000C (refer to FIG. 3) and provide the coordinate signal I-SS to the main controller 1000C (refer to FIG. 3).

The sensor driver 2000 may include a sensor controller 200C1, a signal generation circuit 200C2, and an input detection circuit 200C3. The sensor controller 200C1, the signal generation circuit 200C2, and the input detection circuit 200C3 may be implemented in a single chip. Alternatively, some of the sensor controller 200C1, the signal generation circuit 200C2, and the input detection circuit 200C3 and another part thereof may be implemented in different chips.

The sensor controller 200C1 may control an operation of the signal generation circuit 200C2, may calculate coordinates of the external input from a detection signal received from the input detection circuit 200C3, or may analyze information transmitted from the input device 2000 (refer to FIG. 3) from a modulated signal received from the input detection circuit 200C3.

The signal generation circuit 200C2 may output output signals TS (or transmission signals) to the sensor layer 200, for example, the first electrodes TE1 to TE4. The signal generation circuit 200C2 may output the output signal TS corresponding to an operation mode to the sensor layer 200.

The input detection circuit 200C3 may receive sensing signals SS from the sensor layer 200, for example, the reception electrodes RE1 to RE6. The input detection circuit 200C3 may convert an analog signal into a digital signal. For example, the input detection circuit 200C3 may amplify and then filter the received analog sensing signals SS, and may convert the filtered signal into the digital signal.

The sensor controller 200C1 may generate the coordinate signal I-SS based on the digital signal received from the input detection circuit 200C3. Specifically, the sensor controller 200C1 may generate the coordinate signal I-SS by using the digital signal.

The sensor controller 200C1 may determine the operation mode based on the digital signal received from the input detection circuit 200C3. According to some embodiments, the sensor controller 200C1 may determine the operation mode to be either a touch sensing mode or a pen sensing mode.

According to some embodiments, the sensor controller 20001 may determine the operation mode in response to the digital signal received from the input detection circuit 20003 and the noise pattern signal N_P from the driving controller 10001 (refer to FIG. 6).

According to some embodiments, the sensor controller 20001 may output the horizontal synchronization control signal H_CTRL for changing a horizontal period of the horizontal synchronization signal H_SYNC (refer to FIG. 6) when the determined operation mode is the pen sensing mode.

Figure 8:
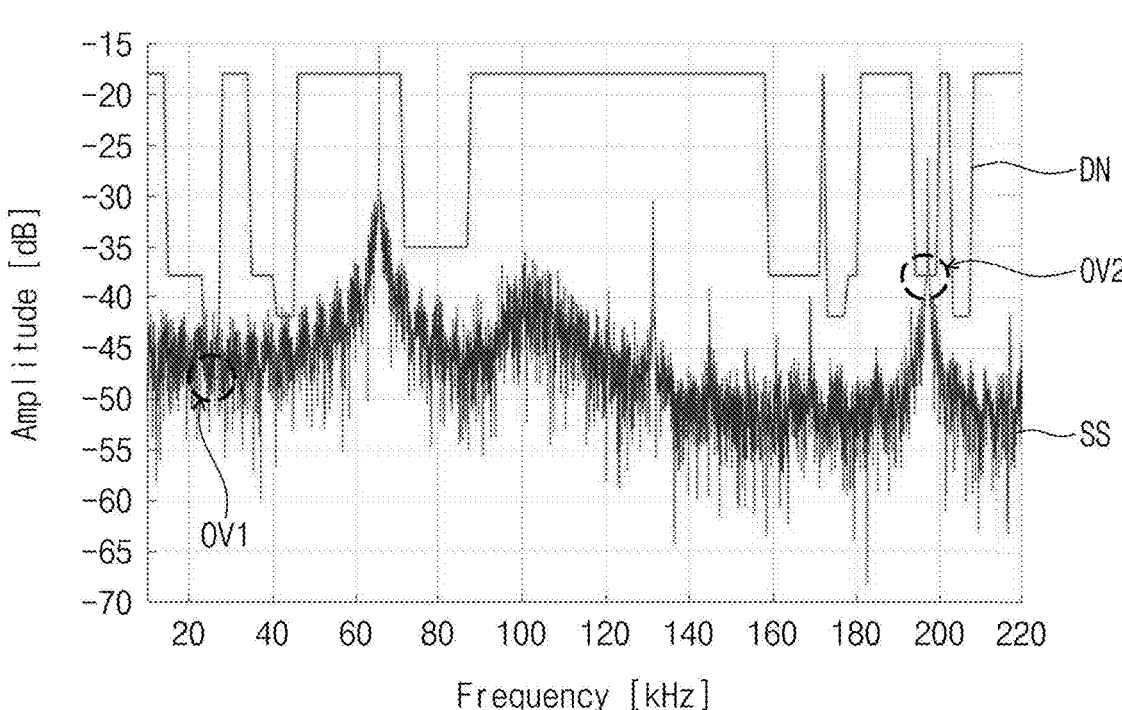
FIG. 8 is a diagram illustrating sensing signals received from reception electrodes and a downlink signal of an input device.

FIG. 8 is a diagram illustrating the sensing signals SS and a downlink signal DN of the input device 2000 received from the reception electrodes RE1 to RE6.

FIG. 8 illustrates the sensing signals SS received when there is no input by the touch of the user and no input by the input device 2000.

As illustrated in FIG. 8, even when there is neither the input by the touch of the user nor the input by the input device 2000, the sensor controller 20001 may receive the sensing signals SS including noise. The sensing signals SS including the noise may have various frequencies and various amplitudes.

The downlink signal DN is a signal transmitted from the input device 2000 to the electronic device 1000. The downlink signal DN may have the various frequencies and the various amplitudes.

When the downlink signal DN is transmitted from the input device 2000 while the sensor driver 2000 receives the sensing signals SS including noise, the sensing signals SS and a part of the downlink signal DN may overlap (e.g., overlapping parts of OV1 and OV2). In this case, the downlink signal DN may be mixed with the noise such that the sensor driver 2000 may not be able to recognize the downlink signal DN.

Figure 9:
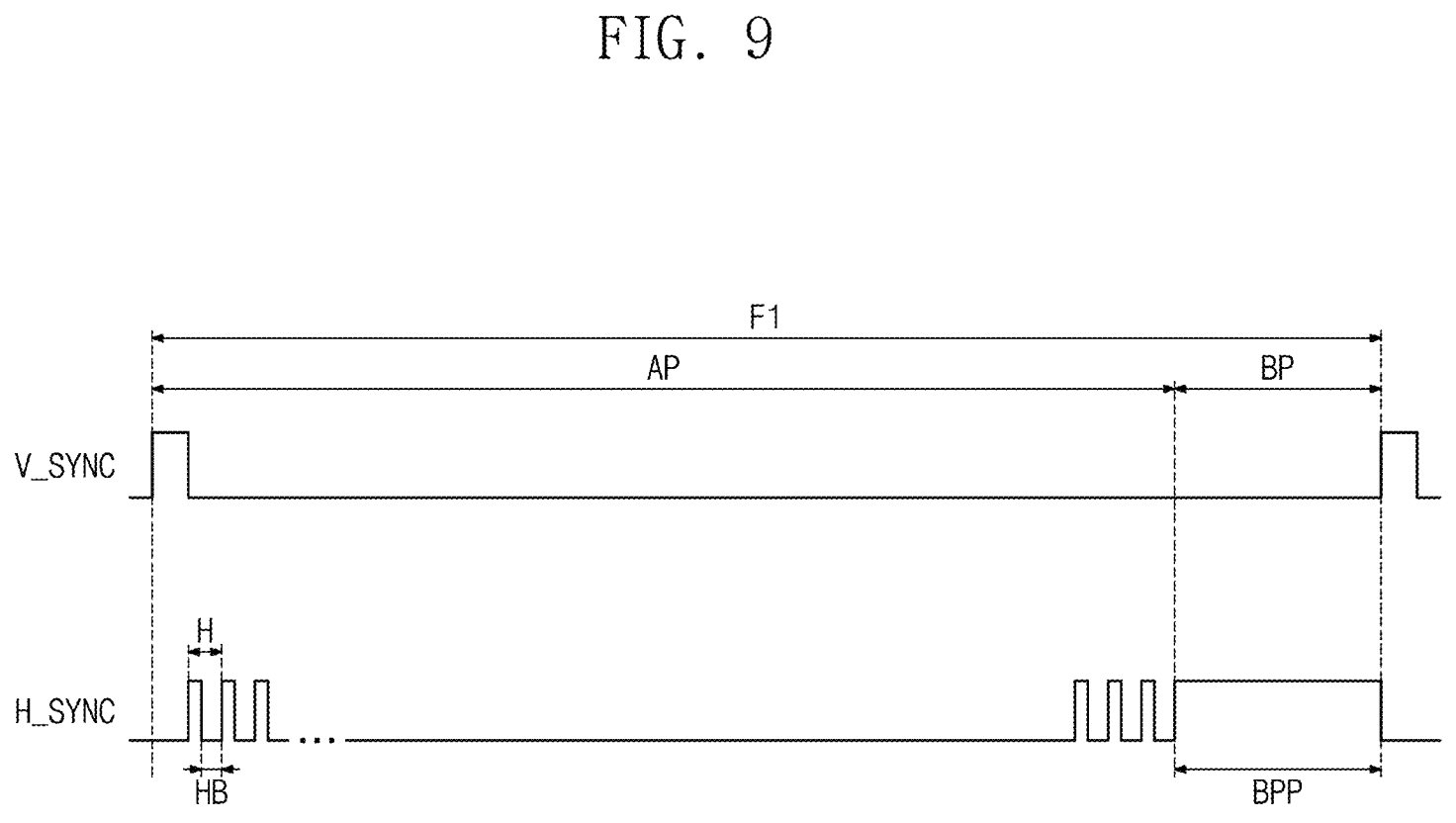

FIG. 9 is a timing diagram illustrating a vertical synchronization signal V_SYNC and the horizontal synchronization signal H_SYNC.

Referring to FIG. 6 and FIG. 9, the vertical synchronization signal V_SYNC and the horizontal synchronization signal H_SYNC are signals provided from the driving controller 100C1 to the data driving circuit 100C2. According to some embodiments, the vertical synchronization signal V_SYNC may be a signal included in the data control signal DCS.

The vertical synchronization signal V_SYNC may be a signal which transitions to the active level (e.g., a high level) in every frame. A frame F1 includes an active period AP and a blank period BP.

The horizontal synchronization signal H_SYNC may transition to the active level (e.g., the high level) several times during the active period AP in the frame F1. The number of pulses of the horizontal synchronization signal H_SYNC in the frame F1 may be equal to the number of the pixels PX arranged in the first direction DR1 of the display layer 100.

One period (or an interval between pulses) of the horizontal synchronization signal H_SYNC during the active period AP in the frame F1 may be referred to as a "horizontal period H". The horizontal period H includes a horizontal blank period HB in which the horizontal synchronization signal H_SYNC is maintained at an inactive level (e.g., a low level). According to some embodiments, the horizontal synchronization signal H_SYNC may be maintained at a level (e.g., a set or predetermined level), for example, the active level (e.g., the high level) during a back porch period BPP, but embodiments according to the present disclosure are not limited thereto. During the blank period BP, the horizontal synchronization signal H_SYNC may be maintained at the inactive level (e.g., the low level). According to some embodiments, the blank period BP in the frame F1 may be the same as the back porch period BPP of the horizontal synchronization signal H_SYNC.

Although FIG. 9 illustrates that the horizontal synchronization signal H_SYNC includes the back porch period BPP, the horizontal synchronization signal H_SYNC may include a front porch period instead of the back porch period BPP. Additionally, according to some embodiments, the horizontal synchronization signal H_SYNC may include both the front porch period and the back porch period BPP.

As illustrated in FIG. 4A, FIG. 4B, and FIG. 5, the display layer 100 and the sensor layer 200 are located adjacent to each other. The data signals transferred to the pixels PX of the display layer 100 may affect the sensor layer 200. That is, as illustrated in FIG. 8, even when there is neither the input by the touch of the user nor the input by the input device 2000, the sensor controller 200C1 may receive the sensing signals SS including the noise by the data signals transferred to the pixels PX of the display layer 100.

The data driving circuit 100C2 may output the data signal to the data lines DL1 to DLm in synchronization with the horizontal synchronization signal H_SYNC. That is, the data signal is output to the data lines DL1 to DLm during the active period in the horizontal period H of the horizontal synchronization signal H_SYNC. In this case, noise levels of the sensing signals SS received from the sensor controller 200C1 may increase.

Figure 10:
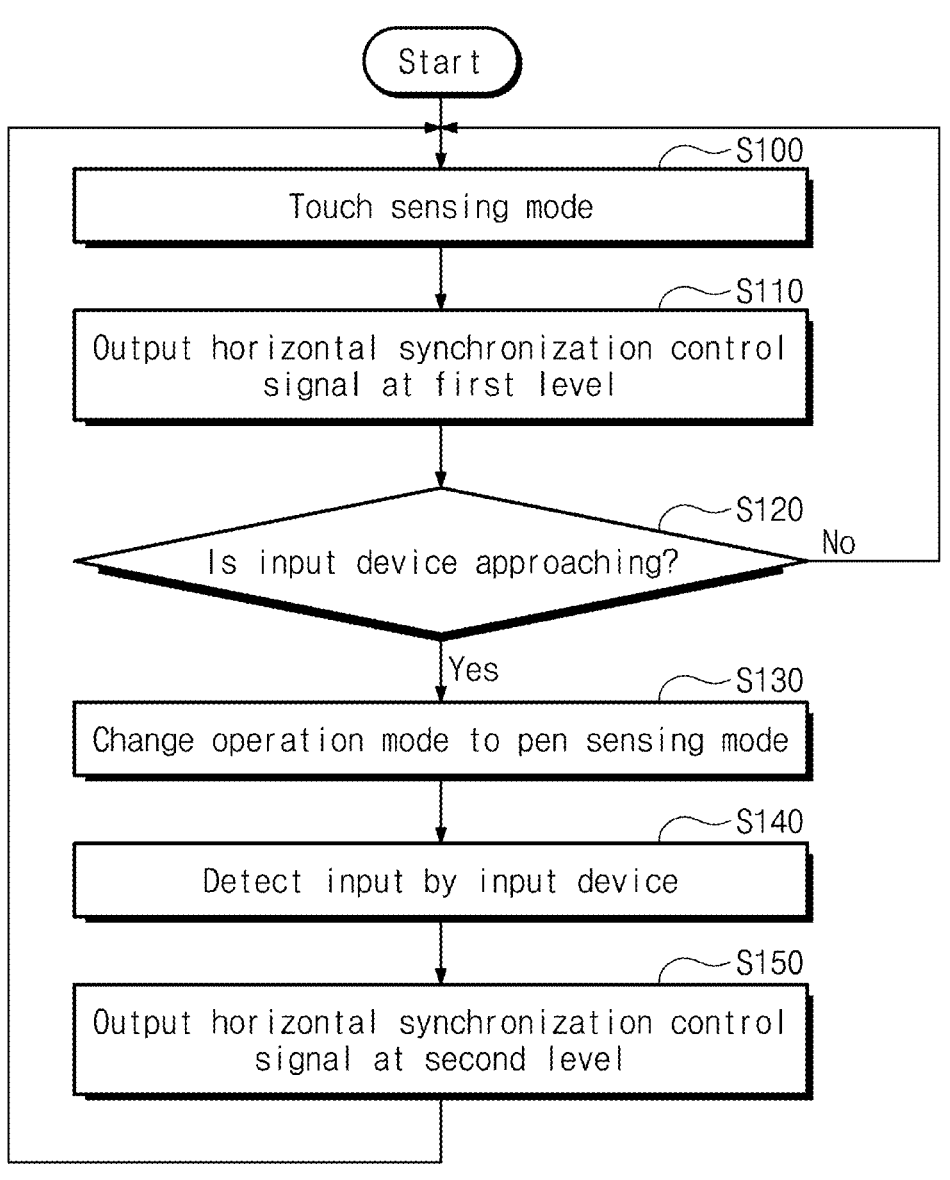
FIG. 10 is a flowchart illustrating aspects of an operation of a sensor driver according to some embodiments of the present disclosure.

FIG. 10 is a flowchart illustrating an operation of the sensor driver 2000 according to some embodiments of the present disclosure. Although FIG. 10 illustrates various operations in a method of operating a sensor driver according to some embodiments, embodiments according to the present disclosure are not limited thereto, and according to some embodiments, the method may include additional operations, or fewer operations, or the order of operations may vary, unless otherwise stated or implied, without departing from the spirit and scope of embodiments according to the present disclosure.

Figure 11:
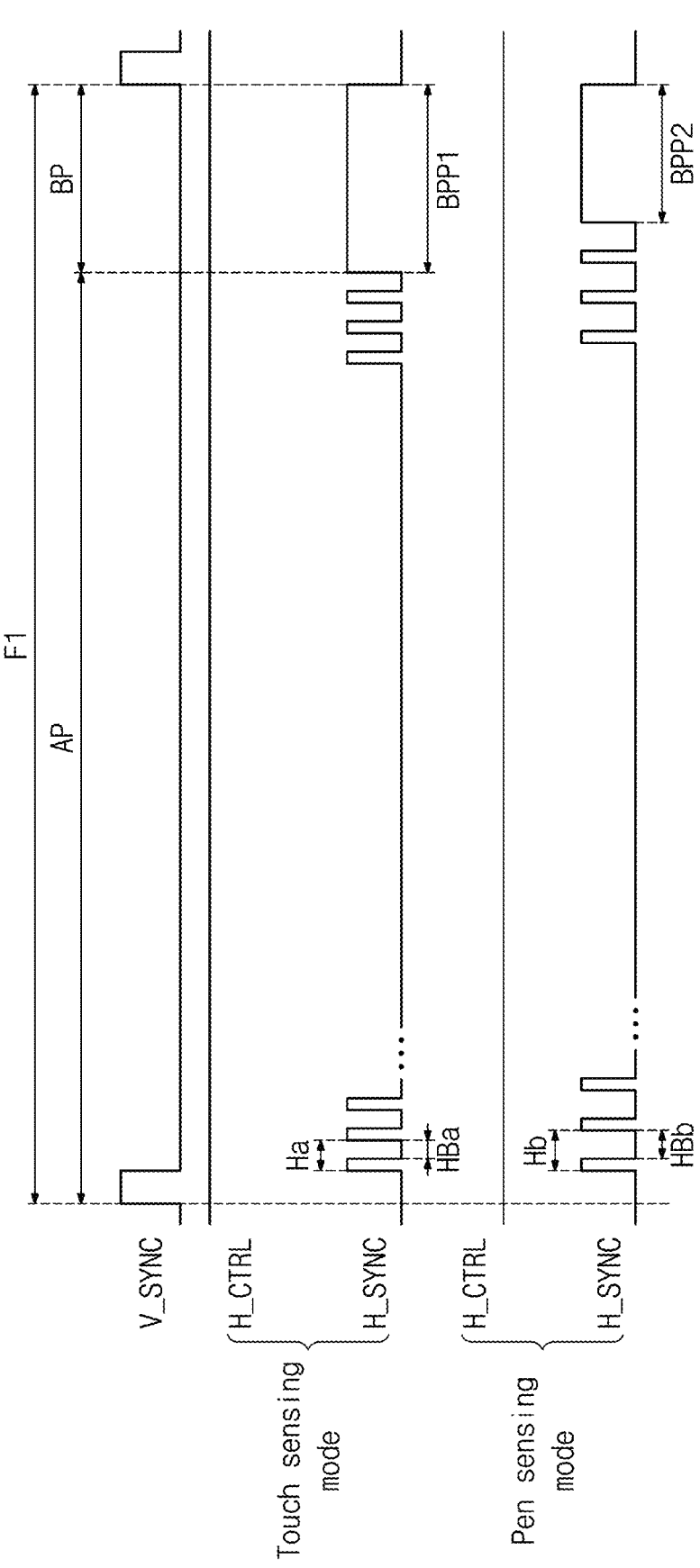
FIG. 11 is a timing diagram of signals according to an operation of a sensor driver according to some embodiments of the present disclosure.

FIG. 11 is a timing diagram of signals according to an operation of the sensor driver 2000 according to some embodiments of the present disclosure.

Referring to FIG. 6, FIG. 7, FIG. 10 and FIG. 11, initially, the sensor controller 200C1 operates in the touch sensing mode (operation S100). That is, initially, the sensor controller 200C1 sets the operation mode to the touch sensing mode. During the touch sensing mode, the sensor controller 200C1 may detect the input by the touch of the user through the sensor layer 200.

The sensor controller 200C1 outputs the horizontal synchronization control signal H_CTRL having a first level (e.g., the low level) during the touch sensing mode (operation S110).

The driving controller 100C1 outputs the horizontal synchronization signal H_SYNC having a first horizontal period Ha in response to the horizontal synchronization control signal H_CTRL of the first level.

The sensor controller 200C1 determines whether the input device 2000 is approaching based on the sensing signals SS received from the reception electrodes RE1 to RE6 (operation S120). When the approach of the input device 2000 is not detected, the sensor controller 200C1 operates in the touch sensing mode.

When the approach of the input device 2000 is detected, the sensor controller 200C1 changes the operation mode to the pen sensing mode (operation S130). During the pen sensing mode, the sensor controller 200C1 detects the input of the input device 2000 through the sensor layer 200 (operation S140).

The sensor controller 200C1 outputs the horizontal synchronization control signal H_CTRL having a second level (e.g., the high level) different from the first level during the pen sensing mode (operation S150).

The driving controller 100C1 outputs the horizontal synchronization signal H_SYNC having a second horizontal period Hb in response to the horizontal synchronization control signal H_CTRL of the second level.

According to some embodiments, the second horizontal period Hb of the horizontal synchronization signal H_SYNC is different from the first horizontal period Ha. Although FIG. 11 illustrates that the second horizontal period Hb of the horizontal synchronization signal H_SYNC is longer than the first horizontal period Ha, embodiments according to the present disclosure are not limited thereto. When the second horizontal period Hb of the horizontal synchronization signal H_SYNC is longer than the first horizontal period Ha, a second horizontal blank period HBb is longer than a first horizontal blank period HBa.

According to some embodiments, the second horizontal period Hb of the horizontal synchronization signal H_SYNC may be shorter than the first horizontal period Ha. When the second horizontal period Hb of the horizontal synchronization signal H_SYNC is shorter than the first horizontal period Ha, the second horizontal blank period HBb is shorter than the first horizontal blank period HBa.

According to some embodiments, the second horizontal period Hb of the horizontal synchronization signal H_SYNC may be set such that a frequency of the noise included in the sensing signals SS does not overlap a frequency of the downlink signal of the input device 2000.

According to some embodiments, a first back porch period BPP1 of the horizontal synchronization signal H_SYNC during the touch sensing mode and a second back porch period BPP2 of the horizontal synchronization signal H_SYNC during the pen sensing mode may be different from each other. In FIG. 11, the second back porch period BPP2 of the horizontal synchronization signal H_SYNC during the pen sensing mode is illustrated to be shorter than the first back porch period BPP1 of the horizontal synchronization signal H_SYNC during the touch sensing mode, but embodiments according to the present disclosure are not limited thereto. When the second horizontal period Hb of the horizontal synchronization signal H_SYNC is shorter than the first horizontal period Ha, the second back porch period BPP2 may be longer than the first back porch period BPP1.

Although FIG. 11 illustrates that the horizontal synchronization signal H_SYNC includes the back porch period BPP, the horizontal synchronization signal H_SYNC may include the front porch period instead of the back porch period BPP. Additionally, according to some embodiments, the horizontal synchronization signal H_SYNC may include both the front porch period and the back porch period BPP.

When the horizontal synchronization signal H_SYNC includes the front porch period, the front porch period of the horizontal synchronization signal H_SYNC during the pen sensing mode may have a time different from the front porch period of the touch sensing mode.

During the pen sensing mode, as the horizontal period of the horizontal synchronization signal H_SYNC changes to the second horizontal period Hb, which is different from the first horizontal period Ha, a timing at which the data signal is output to the data lines DL1 to DLm may be changed. As a result, the frequency of the noise of the sensing signals SS may be changed so as not to overlap the frequency of the downlink signal DN. Therefore, the performance of the sensor driver 2000 in detecting the downlink signal DN may be relatively improved.

FIG. 10 illustrates that the sensor controller 200C1 changes the operation mode to the pen sensing mode when the approach of the input device 2000 is detected, but embodiments according to the present disclosure are not limited thereto. For example, in a specific situation, such as when the application program changes the operation mode to a pen using mode or when the user sets the pen using mode, the sensor controller 200C1 may change the operation mode to the pen sensing mode.

Figure 12:
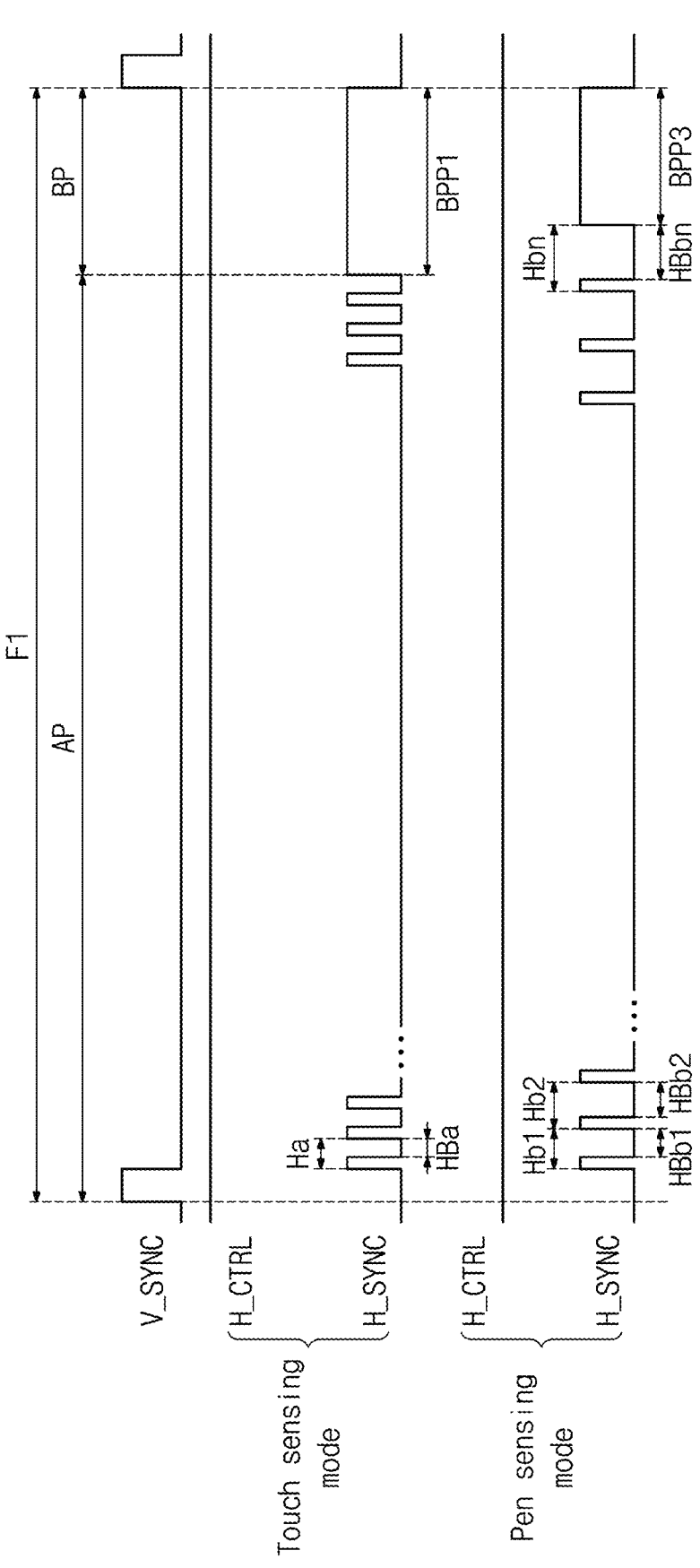
FIG. 12 is a timing diagram of signals according to an operation of a sensor driver according to some embodiments of the present disclosure.

FIG. 12 is a timing diagram of signals according to an operation of the sensor driver 2000 according to some embodiments of the present disclosure.

Referring to FIG. 6, FIG. 7, FIG. 10, and FIG. 12, the sensor controller 200C1 outputs the horizontal synchronization control signal H_CTRL having the first level (e.g., the low level) during the touch sensing mode. The driving controller 100C1 outputs the horizontal synchronization signal H_SYNC having the first horizontal period Ha in response to the horizontal synchronization control signal H_CTRL having the first level.

The sensor controller 200C1 outputs the horizontal synchronization control signal H_CTRL having the second level (e.g., the high level) different from the first level during the pen sensing mode. The driving controller 100C1 outputs the horizontal synchronization signal H_SYNC including pulses having different horizontal periods Hb1 to Hbn during the frame F1 in response to the horizontal synchronization control signal H_CTRL of the second level. Each of horizontal blank periods HBb1 to HBbn has a different time in each of the horizontal periods Hb1 to Hbn. According to some embodiments, the first back porch period BPP1 of the horizontal synchronization signal H_SYNC during the touch sensing mode may be different from a third back porch period BPP3 of the horizontal synchronization signal H_SYNC during the pen sensing mode. Although FIG. 12 illustrates that the third back porch period BPP3 of the horizontal synchronization signal H_SYNC in the pen sensing mode is shorter than the first back porch period BPP1 of the horizontal synchronization signal H_SYNC during the touch sensing mode, embodiments according to the present disclosure are not limited thereto. According to some embodiments, the third back porch period BPP3 may be longer than the first back porch period BPP1.

Figure 13:
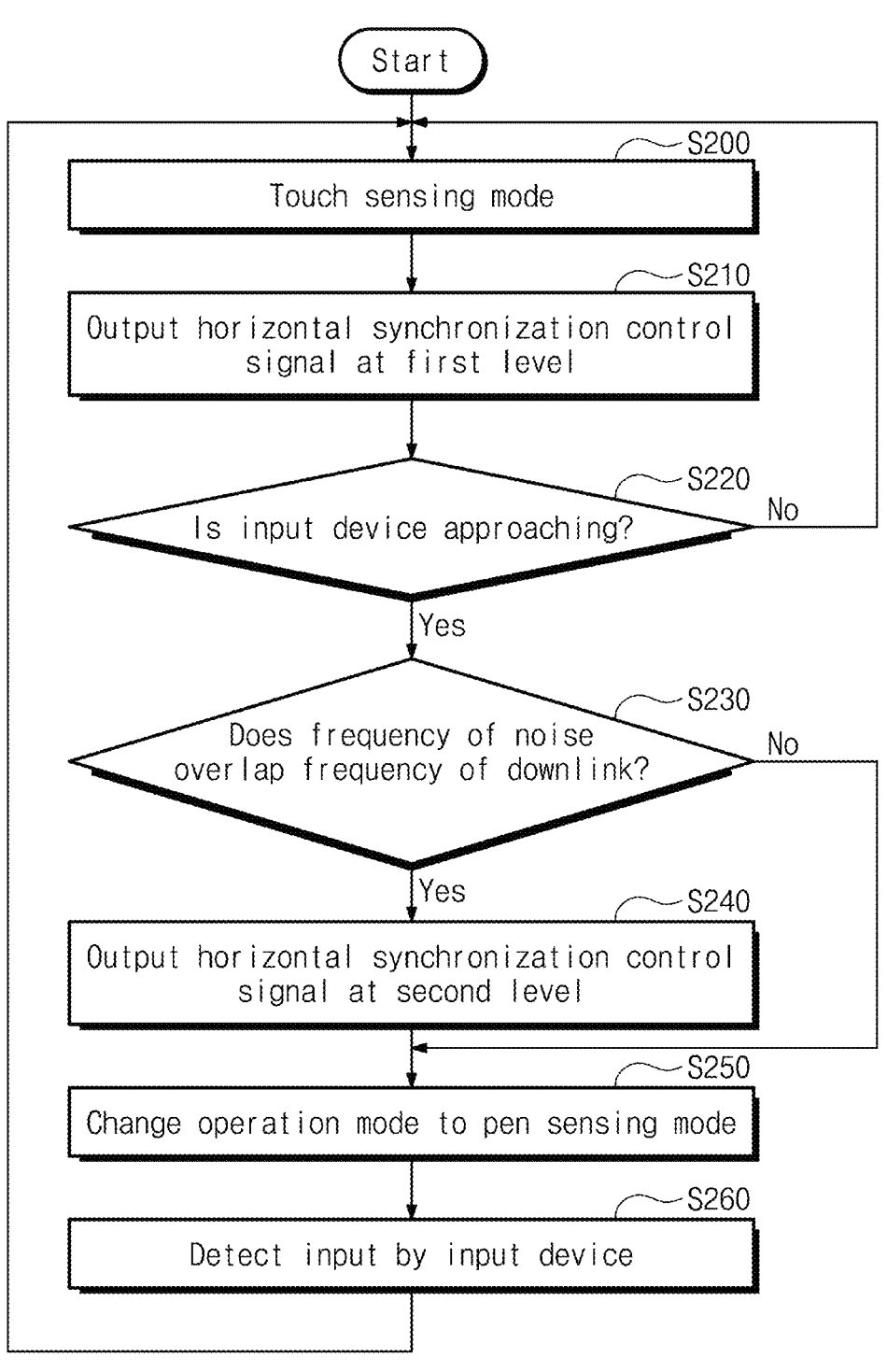
FIG. 13 is a flowchart illustrating aspects of an operation of a sensor driver according to some embodiments of the present disclosure.

FIG. 13 is a flowchart illustrating an operation of the sensor driver 200C according to some embodiments of the present disclosure. Although FIG. 13 illustrates various operations in a method of operating a sensor driver according to some embodiments, embodiments according to the present disclosure are not limited thereto, and according to some embodiments, the method may include additional operations, or fewer operations, or the order of operations may vary, unless otherwise stated or implied, without departing from the spirit and scope of embodiments according to the present disclosure.

Referring to FIG. 6, FIG. 7, FIG. 11, and FIG. 13, initially, the sensor controller 200C1 operates in the touch sensing mode (operation S200). That is, initially, the sensor controller 200C1 sets the operation mode to the touch sensing mode. During the touch sensing mode, the sensor controller 200C1 may detect the input by the touch of the user through the sensor layer 200.

The sensor controller 200C1 outputs the horizontal synchronization control signal H_CTRL having the first level (e.g., the low level) during the touch sensing mode (operation S210).

The driving controller 100C1 outputs the horizontal synchronization signal H_SYNC having the first horizontal period Ha in response to the horizontal synchronization control signal H_CTRL of the first level.

The sensor controller 200C1 determines whether the input device 2000 is approaching based on the sensing signals SS received from the reception electrodes RE1 to RE6 (operation S220). When the approach of the input device 2000 is not detected, the sensor controller 200C1 operates in the touch sensing mode.

When the approach of the input device 2000 is detected, the sensor controller 200C1 determines a noise frequency based on the sensing signals SS, and determines whether the noise frequency overlaps a downlink frequency of the input device 2000 (operation S230).

When the noise frequency overlaps the downlink frequency of the input device 2000, the sensor controller 200C1 outputs the horizontal synchronization control signal H_CTRL having the second level (e.g., the high level) different from the first level (operation S240).

The driving controller 100C1 outputs the horizontal synchronization signal H_SYNC having the second horizontal period Hb in response to the horizontal synchronization control signal H_CTRL having the second level. According to some embodiments, the second horizontal period Hb of the horizontal synchronization signal H_SYNC is different from the first horizontal period Ha.

When the noise frequency does not overlap the downlink frequency of the input device 2000, the sensor controller 200C1 maintains the horizontal synchronization control signal H_CTRL of the first level. That is, when the noise frequency does not overlap the downlink frequency of the input device 2000, the sensor controller 200C1 does not perform operation S240, and proceeds directly to operation S250 in an operation control.

The driving controller 100C1 changes the operation mode to the pen sensing mode (operation S250).

During the pen sensing mode, the sensor controller 200C1 detects the input of the input device 2000 through the sensor layer 200 (operation S260).

When the input device 2000 approaches the sensor layer 200 and the noise frequency determined based on the sensing signals SS overlaps the downlink frequency, the timing at which the data signal is output to the data lines DL1 to DLm may be changed depending on the horizontal period of the horizontal synchronization signal H_SYNC being changed to the second horizontal period Hb different from the first horizontal period Ha. As a result, the frequency of the noise of the sensing signals SS may be changed so as not to overlap the frequency of the downlink signal DN. Accordingly, the performance at which the sensor driver 2000 detects the downlink signal DN may be relatively improved.

Figure 14:
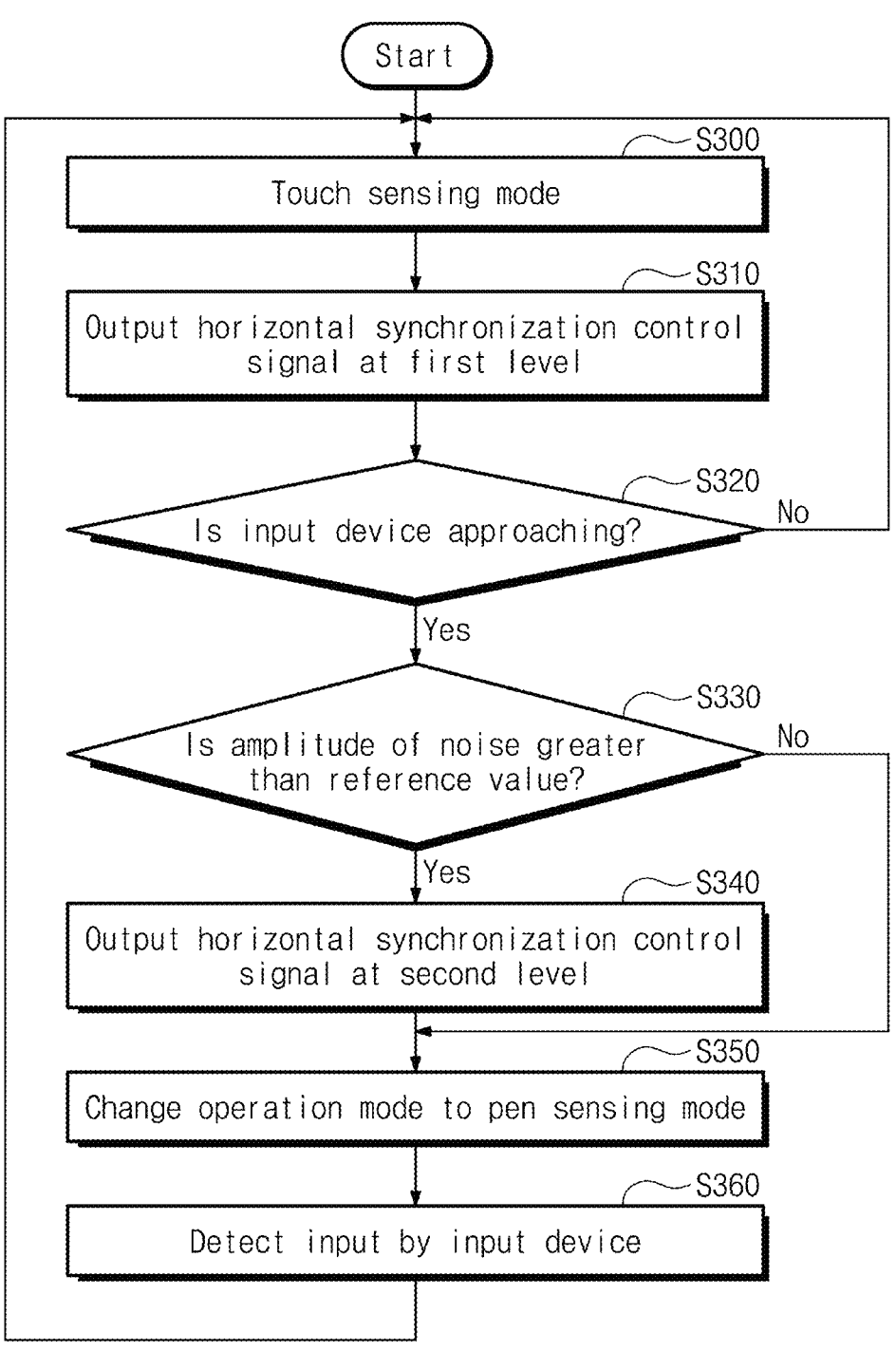
FIG. 14 is a flowchart illustrating aspects of an operation of a sensor driver according to some embodiments of the present disclosure.

FIG. 14 is a flowchart illustrating an operation of the sensor driver 2000 according to some embodiments of the present disclosure. Although FIG. 14 illustrates various operations in a method of operating a sensor driver according to some embodiments, embodiments according to the present disclosure are not limited thereto, and according to some embodiments, the method may include additional operations, or fewer operations, or the order of operations may vary, unless otherwise stated or implied, without departing from the spirit and scope of embodiments according to the present disclosure.

Referring to FIG. 6, FIG. 7, FIG. 11, and FIG. 14, initially, the sensor controller 200C1 operates in the touch sensing mode (operation S300). That is, initially, the sensor controller 200C1 sets the operation mode to the touch sensing mode. During the touch sensing mode, the sensor controller 200C1 may detect the input by the touch of the user through the sensor layer 200.

The sensor controller 200C1 outputs the horizontal synchronization control signal H_CTRL having the first level (e.g., the low level) during the touch sensing mode (operation S310).

The driving controller 100C1 outputs the horizontal synchronization signal H_SYNC having the first horizontal period Ha in response to the horizontal synchronization control signal H_CTRL of the first level.

The sensor controller 200C1 determines whether the input device 2000 is approaching based on the sensing signals SS received from the reception electrodes RE1 to RE6 (operation S320). When the approach of the input device 2000 is not detected, the sensor controller 200C1 operates in the touch sensing mode.

When the approach of the input device 2000 is detected, the sensor controller 200C1 determines an amplitude of the noise based on the sensing signals SS, and determines whether the amplitude of the noise is greater than a reference value (operation S330).

When the amplitude of the noise is greater than the reference value, the sensor controller 200C1 outputs the horizontal synchronization control signal H_CTRL having the second level (e.g., the high level) different from the first level (operation S340).

The driving controller 100C1 outputs the horizontal synchronization signal H_SYNC having the second horizontal period Hb in response to the horizontal synchronization control signal H_CTRL having the second level. According to some embodiments, the second horizontal period Hb of the horizontal synchronization signal H_SYNC is different from the first horizontal period Ha.

When the amplitude of the noise is not greater than the reference value, the sensor controller 200C1 maintains the horizontal synchronization control signal H_CTRL of the first level. That is, when the amplitude of the noise is not greater than the reference value, the sensor controller 200C1 does not perform the operation S340, and proceeds to the operation S350.

The driving controller 100C1 changes the operation mode to the pen sensing mode (operation S350).

During the pen sensing mode, the sensor controller 200C1 detects the input of the input device 2000 through the sensor layer 200 (operation S360).

When the input device 2000 approaches the sensor layer 200 and the amplitude of the noise determined based on the sensing signals SS is greater than the reference value, the timing at which the data signal is output to the data lines DL1 to DLm may be changed depending on the horizontal period of the horizontal synchronization signal H_SYNC being changed to the second horizontal period Hb different from the first horizontal period Ha. As a result, the frequency of the noise of the sensing signals SS may be changed so as not to overlap the frequency of the downlink signal DN. Accordingly, the performance at which the sensor driver 2000 detects the downlink signal DN may be relatively improved.

Figure 15:
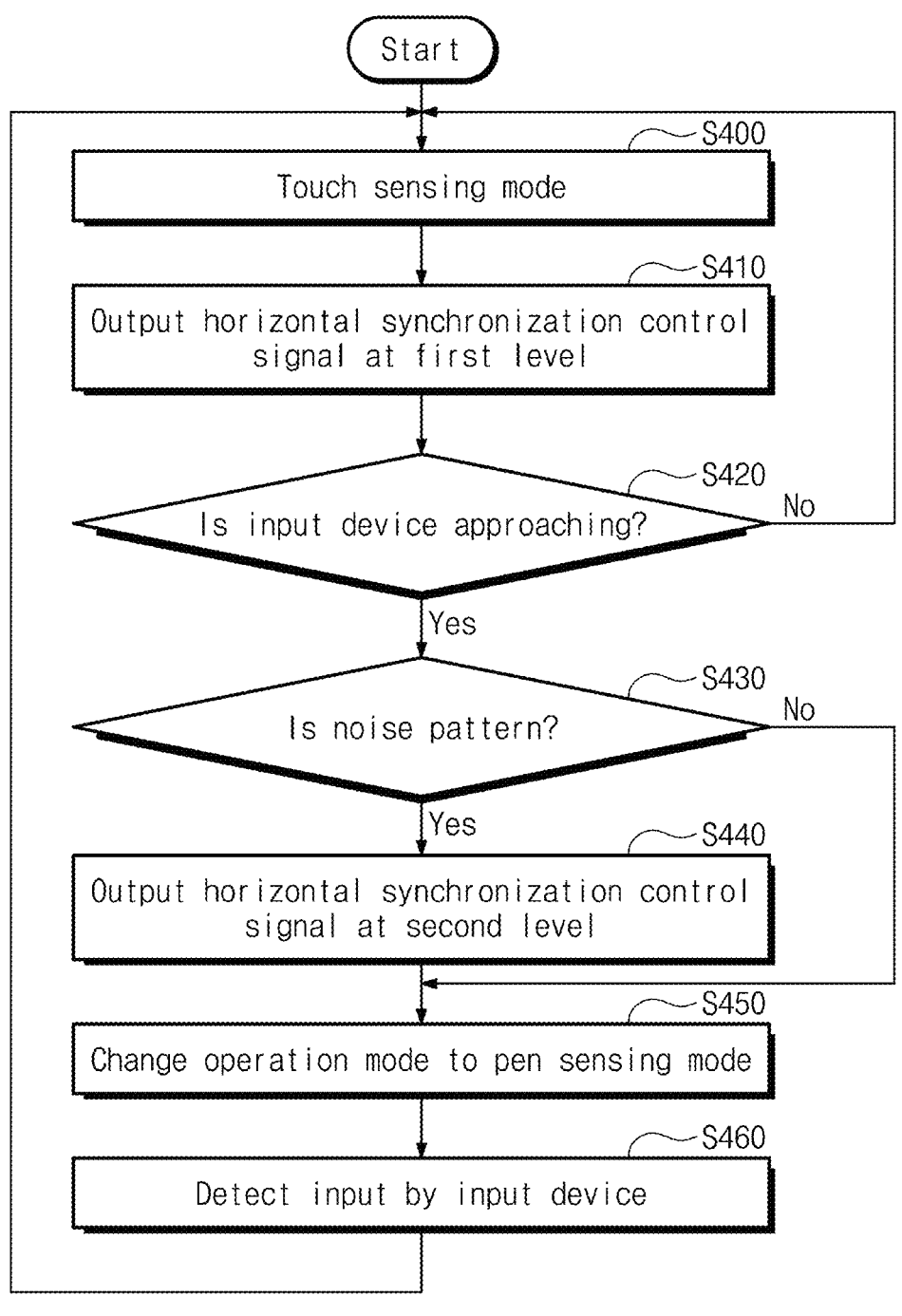
FIG. 15 is a flowchart illustrating aspects of an operation of a sensor driver according to some embodiments of the present disclosure.

FIG. 15 is a flowchart illustrating an operation of the sensor driver 2000 according to some embodiments of the present disclosure. Although FIG. 15 illustrates various operations in a method of operating a sensor driver according to some embodiments, embodiments according to the present disclosure are not limited thereto, and according to some embodiments, the method may include additional operations, or fewer operations, or the order of operations may vary, unless otherwise stated or implied, without departing from the spirit and scope of embodiments according to the present disclosure.

Referring to FIG. 6, FIG. 7, FIG. 11, and FIG. 15, initially, the sensor controller 200C1 operates in the touch sensing mode (operation S400). That is, initially, the sensor controller 200C1 sets the operation mode to the touch sensing mode. During the touch sensing mode, the sensor controller 200C1 may detect the input by the touch of the user through the sensor layer 200.

The sensor controller 200C1 outputs the horizontal synchronization control signal H_CTRL having the first level (e.g., the low level) during the touch sensing mode (operation S410).

The driving controller 100C1 outputs the horizontal synchronization signal H_SYNC having the first horizontal period Ha in response to the horizontal synchronization control signal H_CTRL of the first level.

The sensor controller 200C1 determines whether the input device 2000 is approaching based on the sensing signals SS received from the reception electrodes RE1 to RE6 (operation S420). When the approach of the input device 2000 is not detected, the sensor controller 200C1 operates in the touch sensing mode.

When the approach of the input device 2000 is detected, the sensor controller 200C1 determines whether the pattern of the input image signal RGB is the noise pattern based on the noise pattern signal N_P. When the noise pattern signal N_P is at the active level, the sensor controller 200C1 recognizes that the pattern of the input image signal RGB is the noise pattern and outputs the horizontal synchronization control signal H_CTRL having the second level (e.g., the high level) different from the first level (operation S440).

The driving controller 100C1 outputs the horizontal synchronization signal H_SYNC having the second horizontal period Hb in response to the horizontal synchronization control signal H_CTRL having the second level. According to some embodiments, the second horizontal period Hb of the horizontal synchronization signal H_SYNC is different from the first horizontal period Ha.

When the noise pattern signal N_P is at the inactive level, the sensor controller 200C1 maintains the horizontal synchronization control signal H_CTRL of the first level. That is, when the noise pattern signal N_P is at the inactive level, the sensor controller 200C1 does not perform the operation S440, and proceeds to operation S450.

The driving controller 100C1 changes the operation mode to the pen sensing mode (operation S450).

During the pen sensing mode, the sensor controller 200C1 detects the input of the input device 2000 through the sensor layer 200 (operation S460).

When the input device 2000 approaches the sensor layer 200 and it is determined that the pattern of the input image signal RGB is the noise pattern affecting the sensor layer 200, the timing at which the data signal is output to the data lines DL1 to DLm may be changed depending on the horizontal period of the horizontal synchronization signal H_SYNC being changed to the second horizontal period Hb different from the first horizontal period Ha. As a result, the frequency of the noise of the sensing signals SS may be changed so as not to overlap the frequency of the downlink signal DN. Accordingly, the performance at which the sensor driver 2000 detects the downlink signal DN may be relatively improved.

Figures 16A, 16B:
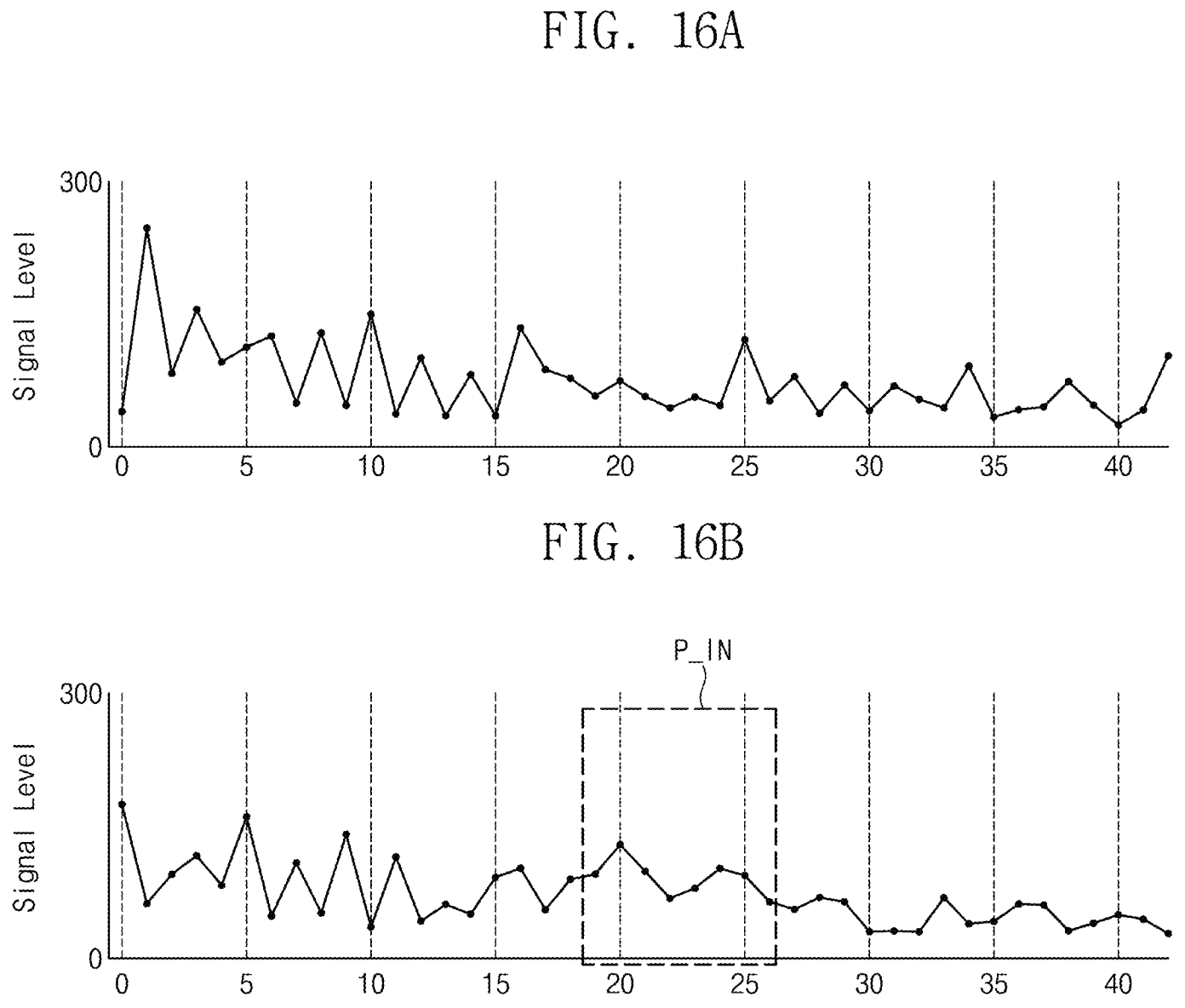

FIG. 16A and FIG. 16B are diagrams illustrating a signal level change of the coordinate signal I-SS according to the approach of the input device 2000 when the noise is large.

Figures 17A, 17B:
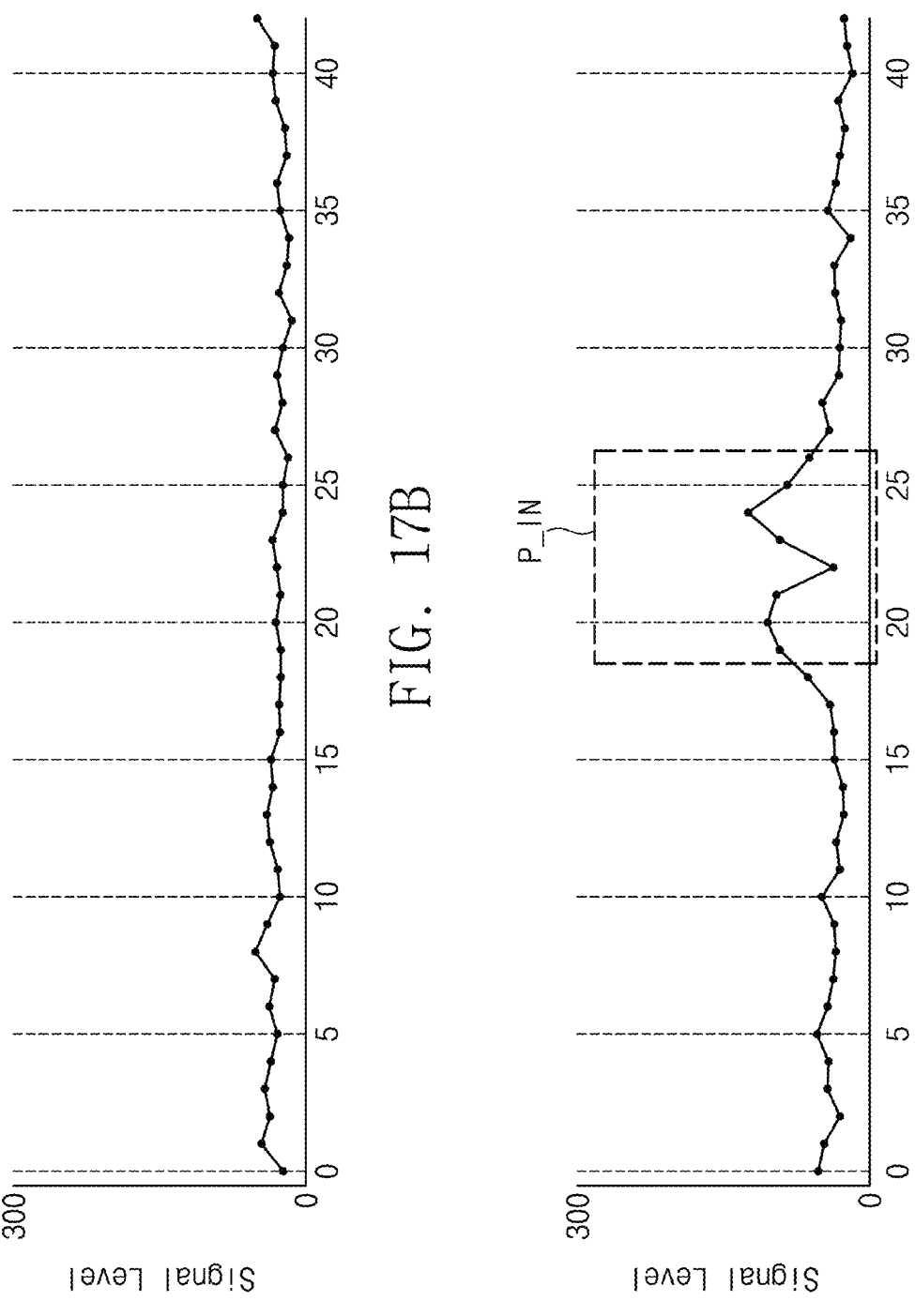
FIG. 17A and FIG. 17B are diagrams illustrating a signal level change of a coordinate signal according to an approach of an input device when a horizontal period of a horizontal synchronization signal is changed.

FIG. 17A and FIG. 17B are diagrams illustrating the signal level change of the coordinate signal I-SS according to the approach of the input device 2000 when the horizontal period of the horizontal synchronization signal is changed.

Referring to FIG. 7, FIG. 16A, FIG. 16B, FIG. 17A, and FIG. 17B, the horizontal axis is a position in the first direction DR1 of the reception electrode corresponding to the coordinate signal I-SS among the reception electrodes RE1 to RE6, and the vertical axis is a signal level corresponding to the coordinate signal I-SS. The coordinate signal I-SS is a signal in which the sensing signals SS are converted into the digital signal by the input detection circuit 200C3.

Referring to FIG. 7 and FIG. 16A, the coordinate signal I-SS may have a signal level (e.g., a set or predetermined signal level) in a state in which the input device 2000 is not approached.

Referring to FIG. 7 and FIG. 16B, it is difficult for the sensor controller 200C1 to detect the approach even when the input device 2000 approaches a pen input position P_IN in a state where the noise is large.

Referring to FIG. 7 and FIG. 17A, when the operation mode is the pen sensing mode, the horizontal period of the horizontal synchronization signal H_SYNC (refer to FIG. 6) may be changed. When the approach of the input device 2000 is not detected, the coordinate signal I-SS may have the signal level (e.g., the set or predetermined signal level) instead of what is illustrated in FIG. 16A.

Referring to FIG. 7 and FIG. 17B, when the input device 2000 approaches the pen input position P_IN in a state where the noise is reduced, the sensor controller 200C1 may detect the approach of the input device 2000.

The electronic device with above-described configuration changes the horizontal period of the horizontal synchronization signal when the operation mode is changed from the touch sensing mode to the pen sensing mode. As a result, the frequency of the noise of the sensing signals may be changed so as not to overlap the frequency of the downlink signal. Accordingly, the performance at which the sensor driver detects the downlink signal from the input device may be relatively improved.

Although the description has been made above with reference to aspects of some embodiments of the present disclosure, it may be understood that those skilled in the art or those having ordinary knowledge in the art may variously modify and change the present disclosure without departing from the spirit and technical scope of embodiments according to the present disclosure described in the appended claims, and their equivalents. Thus, the technical scope of embodiments according to the present disclosure is not limited to the detailed description of the specification but should be defined by the appended claims, and their equivalents.

What is claimed is:

1. An electronic device comprising:
a display layer configured to display an image;
a driving controller configured to receive an input image signal and a control signal and to output a horizontal synchronization signal and image data;
a data driving circuit configured to provide a data signal to the display layer in response to the horizontal synchronization signal and the image data;
a sensor layer on the display layer; and
a sensor driver configured to drive the sensor layer and to receive sensing signals from the sensor layer,
wherein the sensor driver is configured to:
output a horizontal synchronization control signal of a first level during a touch sensing mode of detecting a touch input; and
output the horizontal synchronization control signal of a second level different from the first level during a pen sensing mode of detecting a pen input, and
wherein the driving controller is configured to change a horizontal period of the horizontal synchronization signal in response to the horizontal synchronization control signal.

2. The electronic device of claim 1, wherein the driving controller is configured to:
output the horizontal synchronization signal including a first horizontal period based on the horizontal synchronization control signal being at the first level; and
output the horizontal synchronization signal including a second horizontal period different from the first horizontal period based on the horizontal synchronization control signal being at the second level.

3. The electronic device of claim 2, wherein the second horizontal period of the horizontal synchronization signal is set such that a frequency of noise included in the sensing signals does not overlap a frequency of a downlink signal from an input device.

4. The electronic device of claim 2, wherein the horizontal synchronization signal includes a plurality of pulses, and
wherein each of the plurality of pulses includes the second horizontal period during the pen sensing mode.

5. The electronic device of claim 2, wherein the horizontal synchronization signal includes a plurality of pulses, and
wherein a time of the second horizontal period of each of the plurality of pulses is differently set during the pen sensing mode.

6. The electronic device of claim 1, wherein the driving controller is configured to:

output the horizontal synchronization signal including a first back porch period based on the horizontal synchronization control signal being at the first level; and output the horizontal synchronization signal including a second back porch period different from the first back porch period based on the horizontal synchronization control signal being at the second level.

7. The electronic device of claim 1, wherein the driving controller is configured to:

output the horizontal synchronization signal including a first horizontal blank period based on the horizontal synchronization control signal being at the first level; and output the horizontal synchronization signal including a second horizontal blank period different from the first horizontal blank period based on the horizontal synchronization control signal being at the second level.

8. The electronic device of claim 1, wherein the sensor driver is configured to:

determine a frequency of noise based on the sensing signals based on an approach of an input device being detected in the touch sensing mode; and output the horizontal synchronization control signal of the second level based on the frequency of the noise overlapping a downlink frequency of the input device.

9. The electronic device of claim 1, wherein the sensor driver is configured to:

determine an amplitude of noise based on the sensing signals based on an approach of an input device being detected in the touch sensing mode; and output the horizontal synchronization control signal of the second level based on the amplitude of the noise being greater than a reference value.

10. The electronic device of claim 1, wherein the driving controller is configured to output a noise pattern signal of an active level based on a pattern of the input image signal being a noise pattern.

11. The electronic device of claim 10, wherein the sensor driver is configured to output the horizontal synchronization control signal of the second level based on an approach of an input device being detected in the touch sensing mode and the noise pattern signal being at the active level.

12. A method of driving an electronic device, the method comprising:

operating in a touch sensing mode of detecting a touch input;

outputting a horizontal synchronization control signal of a first level;

outputting a horizontal synchronization signal of a first horizontal period in response to the horizontal synchronization control signal of the first level;

determining whether an input device is approaching;

outputting the horizontal synchronization control signal of a second level different from the first level based on an approach of the input device being detected; and outputting the horizontal synchronization signal of a second horizontal period in response to the horizontal synchronization control signal of the second level.

13. The method of claim 12, further comprising:

displaying an image on a display layer in response to the horizontal synchronization signal; and receiving sensing signals from a sensor layer on the display layer.

14. The method of claim 13, wherein the second horizontal period of the horizontal synchronization signal is set such that a frequency of noise included in the sensing signals does not overlap a frequency of a downlink signal from the input device.

15. The method of claim 13, wherein the outputting of the horizontal synchronization control signal of the second level different from the first level based on the approach of the input device being detected includes:

determining a frequency of noise based on the sensing signals; and outputting the horizontal synchronization control signal of the second level based on the frequency of the noise overlapping a downlink frequency of the input device.

16. The method of claim 13, wherein the outputting of the horizontal synchronization control signal of the second level different from the first level based on the approach of the input device being detected includes:

determining an amplitude of noise based on the sensing signals; and outputting the horizontal synchronization control signal of the second level based on the amplitude of the noise being greater than a reference value.

17. The method of claim 12, wherein the horizontal synchronization signal includes a first back porch period based on the horizontal synchronization control signal being at the first level, and wherein the horizontal synchronization signal includes a second back porch period different from the first back porch period based on the horizontal synchronization control signal being at the second level.

18. The method of claim 12, wherein the horizontal synchronization signal includes a first horizontal blank period based on the horizontal synchronization control signal being at the first level, and wherein the horizontal synchronization signal includes a second horizontal blank period different from the first horizontal blank period based on the horizontal synchronization control signal being at the second level.

19. The method of claim 12, wherein the horizontal synchronization signal includes a plurality of pulses, and wherein a time of the second horizontal period of each of the plurality of pulses of the horizontal synchronization signal is differently set based on the approach of the input device being detected.

20. The method of claim 12, further comprising:

determining whether a pattern of an input image signal is a noise pattern, wherein the outputting of the horizontal synchronization control signal of the second level different from the first level based on the approach of the input device being detected includes outputting the horizontal synchronization control signal of the second level based on the pattern of the input image signal being the noise pattern.

* * * * *